United States Patent
Abe et al.

(10) Patent No.: US 8,164,925 B2
(45) Date of Patent: Apr. 24, 2012

(54) NON-CONTACT POWER FEEDER

(75) Inventors: Shigeru Abe, Saitama (JP); Hiroyoshi Kaneko, Saitama (JP)

(73) Assignee: National University Corporation Saitama University, Saitama (JP)

( * ) Notice: Subject to any disclaimer, the term of this patent is extended or adjusted under 35 U.S.C. 154(b) by 496 days.

(21) Appl. No.: 12/065,227

(22) PCT Filed: Aug. 7, 2006

(86) PCT No.: PCT/JP2006/315575
§ 371 (c)(1),
(2), (4) Date: Oct. 15, 2009

(87) PCT Pub. No.: WO2007/029438
PCT Pub. Date: Mar. 15, 2007

(65) Prior Publication Data
US 2010/0033156 A1    Feb. 11, 2010

(30) Foreign Application Priority Data
Sep. 1, 2005  (JP) .................................. 2005-253048

(51) Int. Cl.
*H02M 3/335* (2006.01)
(52) U.S. Cl. ........................ 363/21.02; 363/98
(58) Field of Classification Search .............. 363/16–17, 363/21.02, 21.03, 25, 37, 49, 98, 127, 132; 323/282–288, 901, 907; 307/64–66, 123
See application file for complete search history.

(56) References Cited

U.S. PATENT DOCUMENTS
2005/0135129 A1    6/2005 Kazutoshi

FOREIGN PATENT DOCUMENTS
| JP | 2002-049428 A | 2/2002 |
| JP | 2002-272134 A | 9/2002 |
| JP | 2002-320347 A | 10/2002 |
| JP | 2005-162119 A | 6/2005 |

OTHER PUBLICATIONS

A. W. Green et al. "10kHz Inductively Coupled Power Transfer-Concept and Control"; Power Electronics and Variable-Speed Drives, Oct. 26-28, 1994, Conf. Publication No. 399, IEE.
Hideki Ayano et al. "Highly Efficient Contacless Electrical Energy Transmission System"; Electric Academy Papers D., IEEJ Trans. IA, vol. 123, No. 3, pp. 263-270, 2003.
International Search Report of PCT/JP2006/315575, date of mailing Oct. 10, 2006.

*Primary Examiner* — Rajnikant Patel
(74) *Attorney, Agent, or Firm* — Westerman, Hattori, Daniels & Adrian, LLP

(57) ABSTRACT

[Problems]
To provide a non-contact power feeder that is high efficient and high power factor and has no load dependence.
[Means for Solving Problems]
A series capacitor Cs1 is connected to a primary winding 1 driven by an AC power supply 3 and a parallel capacitor Cp2 is connected to a secondary winding 2. The capacitance Cp is set to $Cp \approx 1/\{2\pi f0 \times (x0+x2)\}$ and the capacitance Cs converted to the primary side is set to $Cs \approx (x0+x2)/\{2\pi f0 \times (x0 \times x1 + x1 \times x2 + x2 \times x0)\}$, where f0 is the frequency of the power supply, x1 is a primary leakage reactance of the primary winding 1, x2 is a secondary leakage reactance of the secondary winding 2 converted to the primary side and x0 is an excitation reactance converted to the primary side. By setting Cp and Cs to the above values, the transformer of the non-contact power feeder is substantially equivalent to an ideal transformer. If it is driven by a voltage type converter, the output voltage (=load voltage) becomes substantially constant voltage regardless of the load. In case of a resistive load (ZL=R), the power factor of the power supply output always remains 1 even if the load may vary.

14 Claims, 29 Drawing Sheets

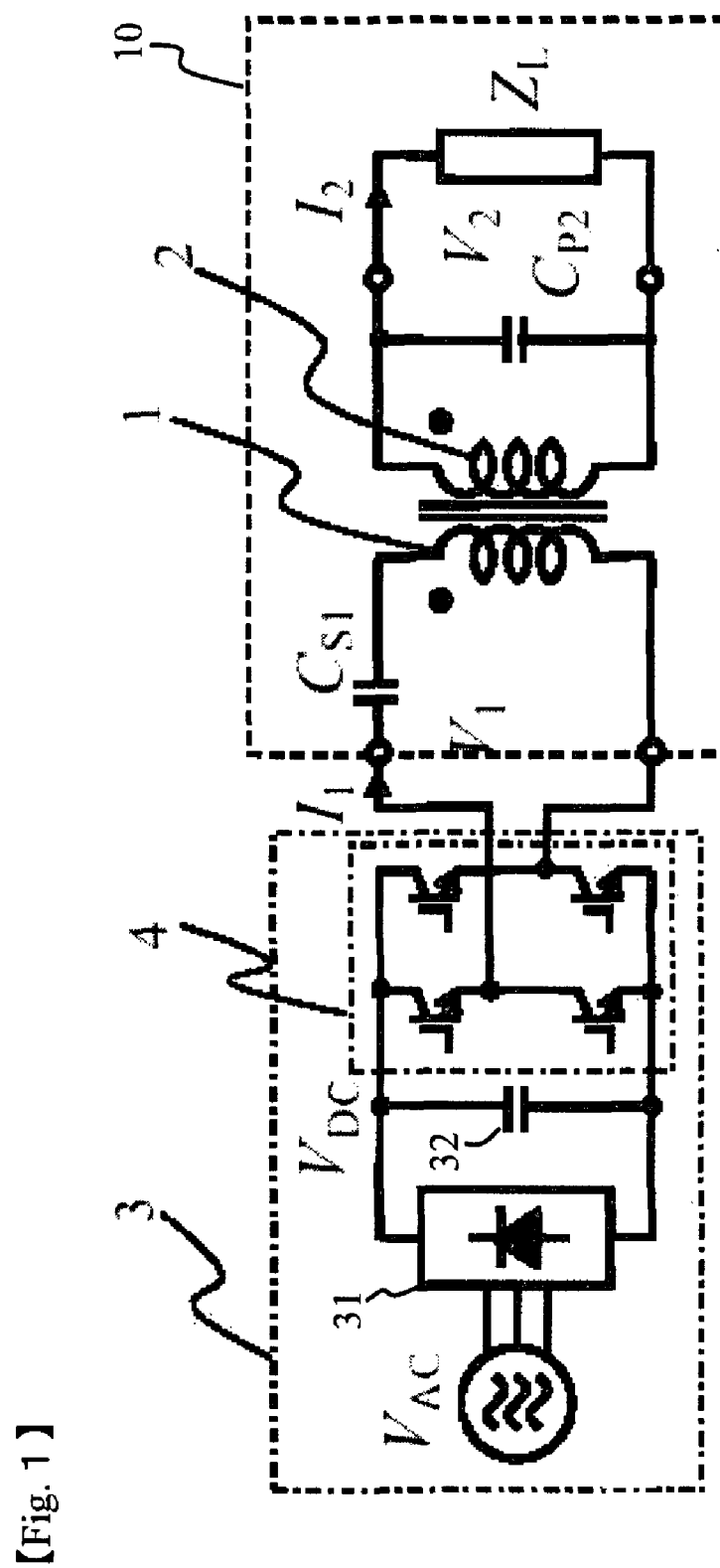
[Fig. 1]

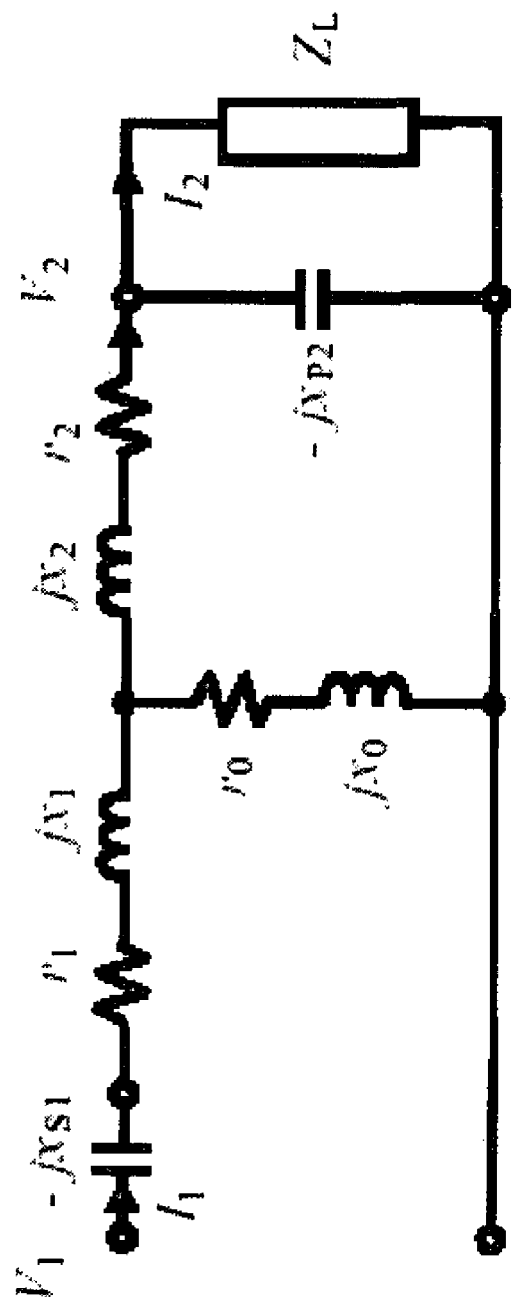
[Fig. 2]

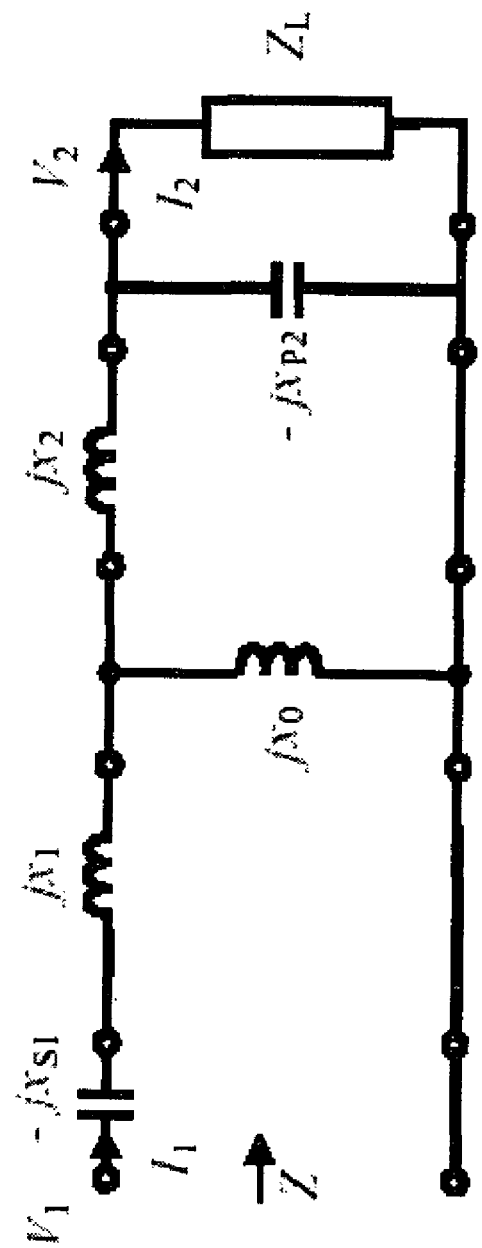
[Fig. 3]

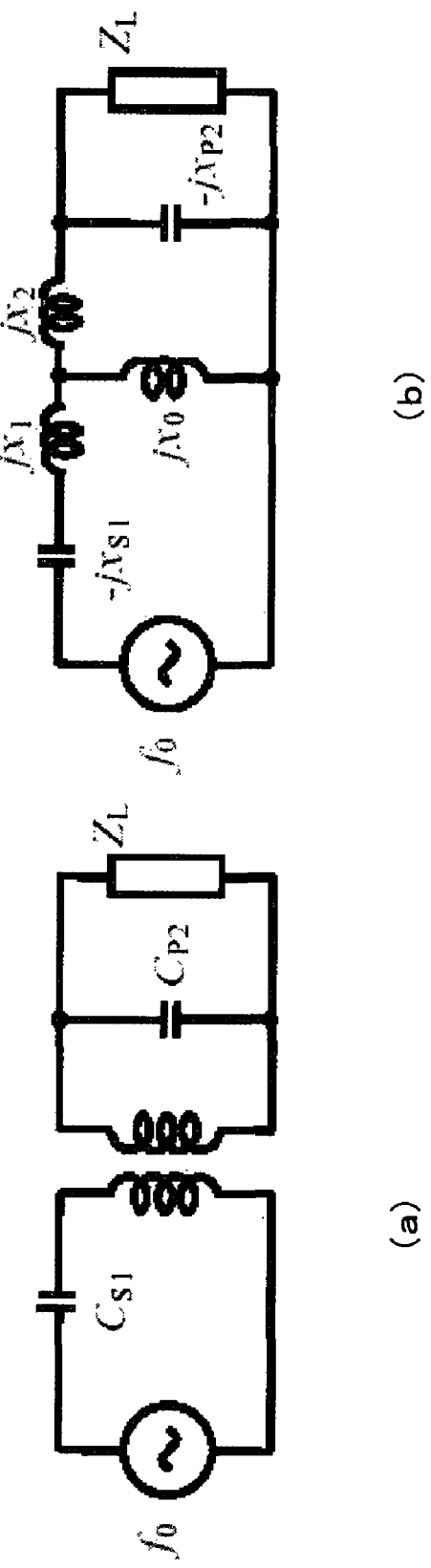
[Fig. 4]

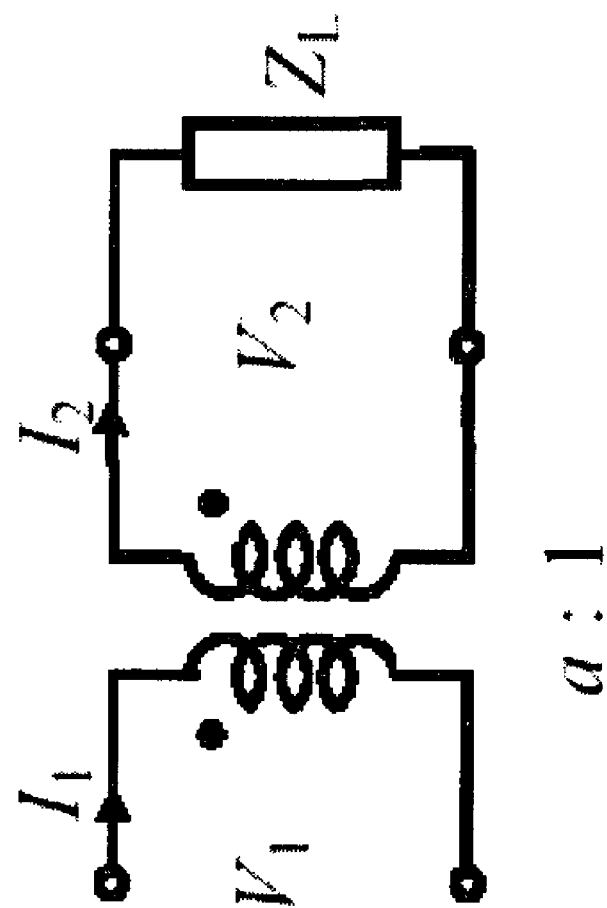
[Fig. 5]

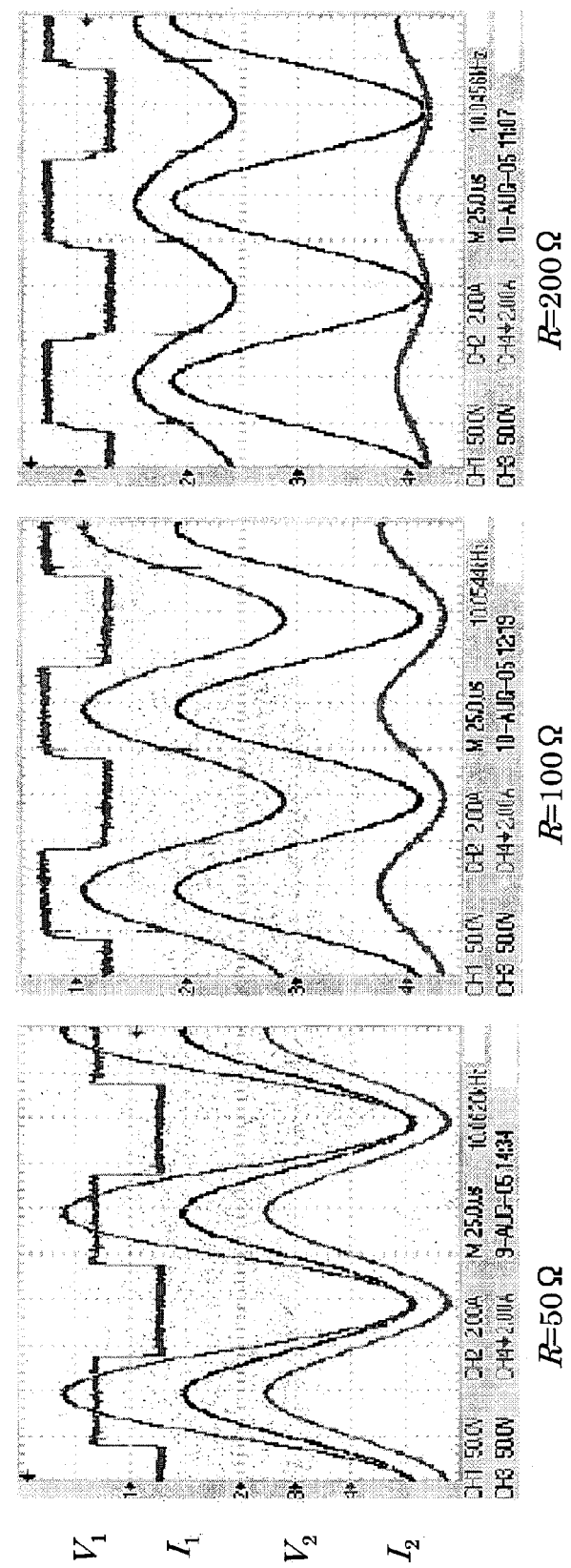
[Fig. 6]

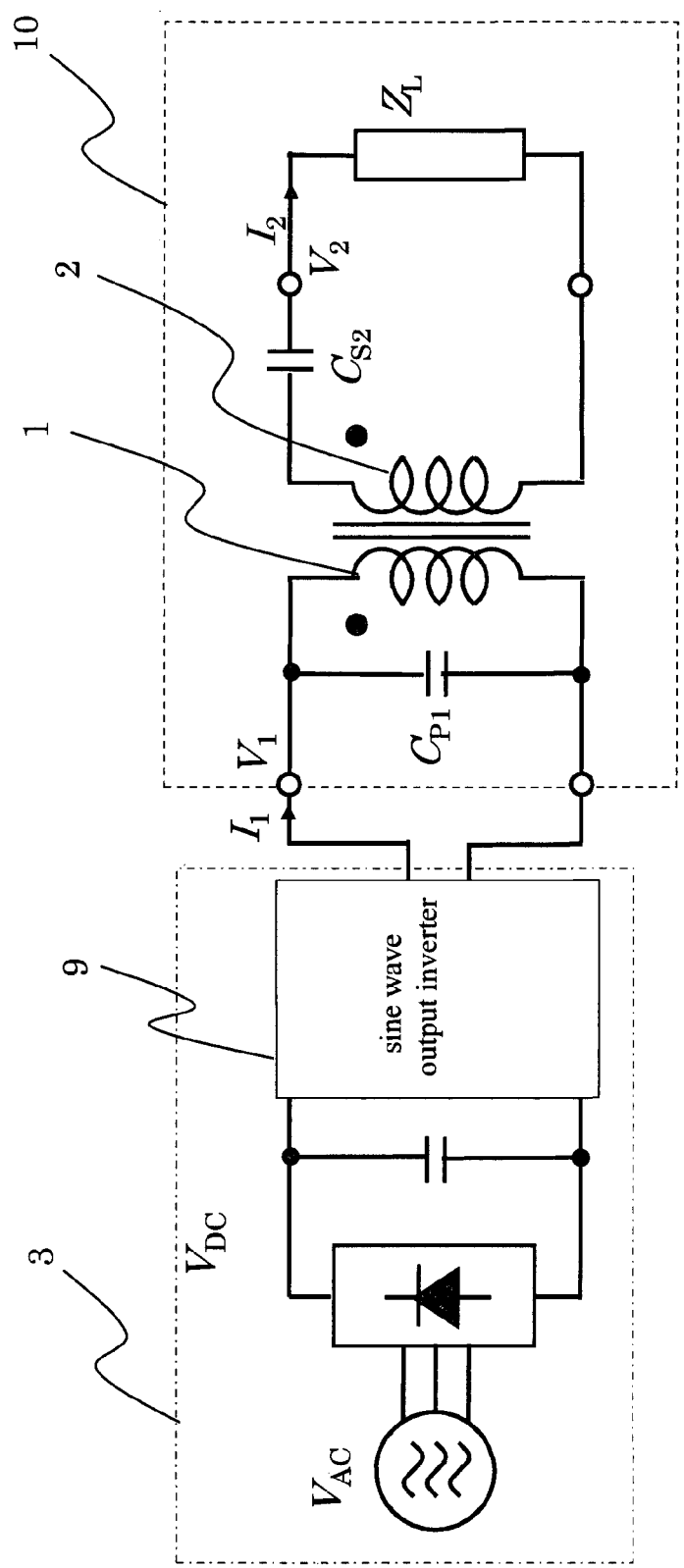
[Fig. 7]

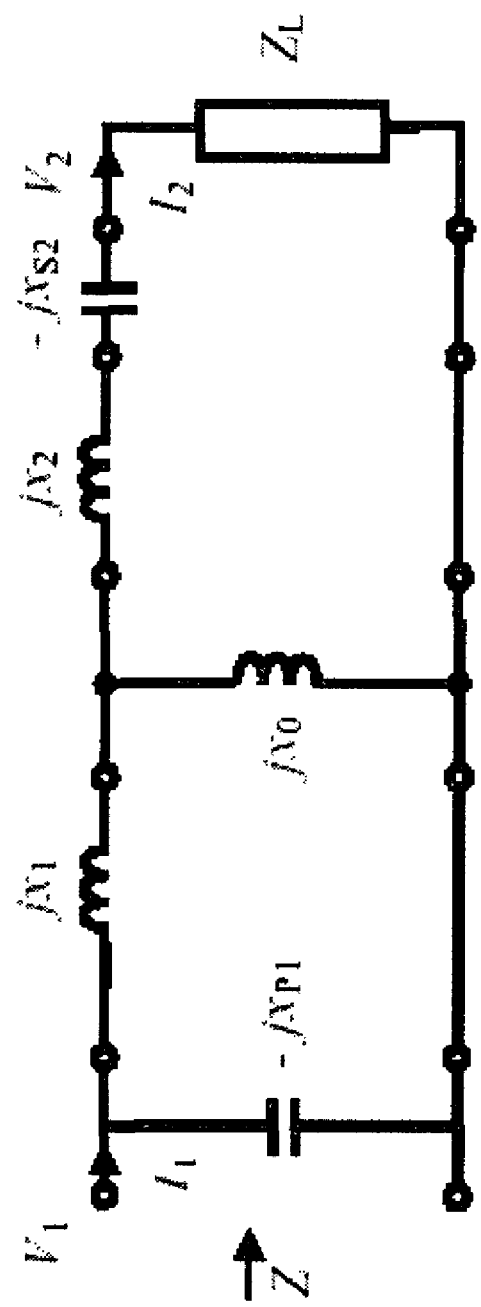
[Fig. 8]

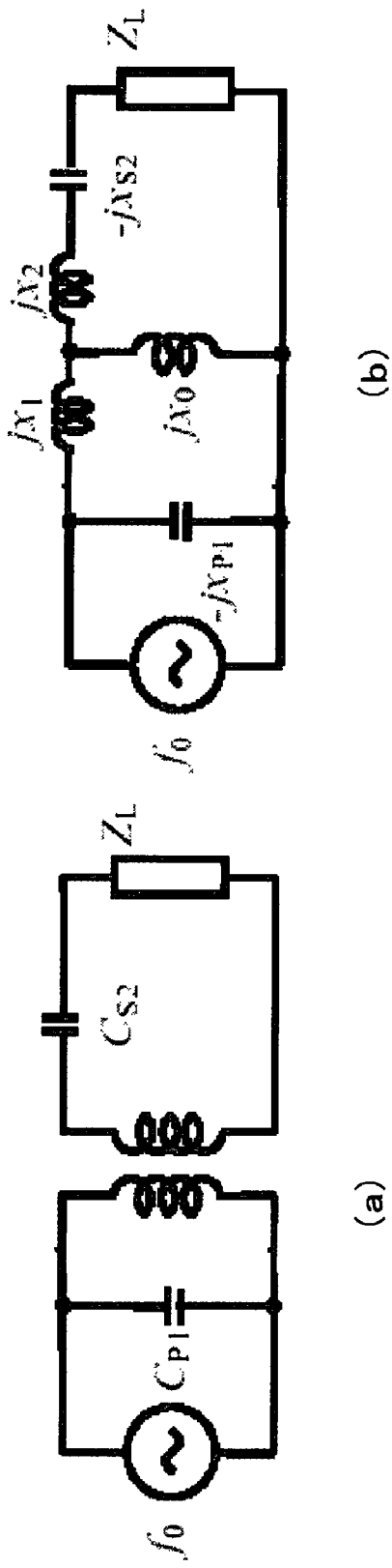
[Fig. 9]

[Fig. 10]
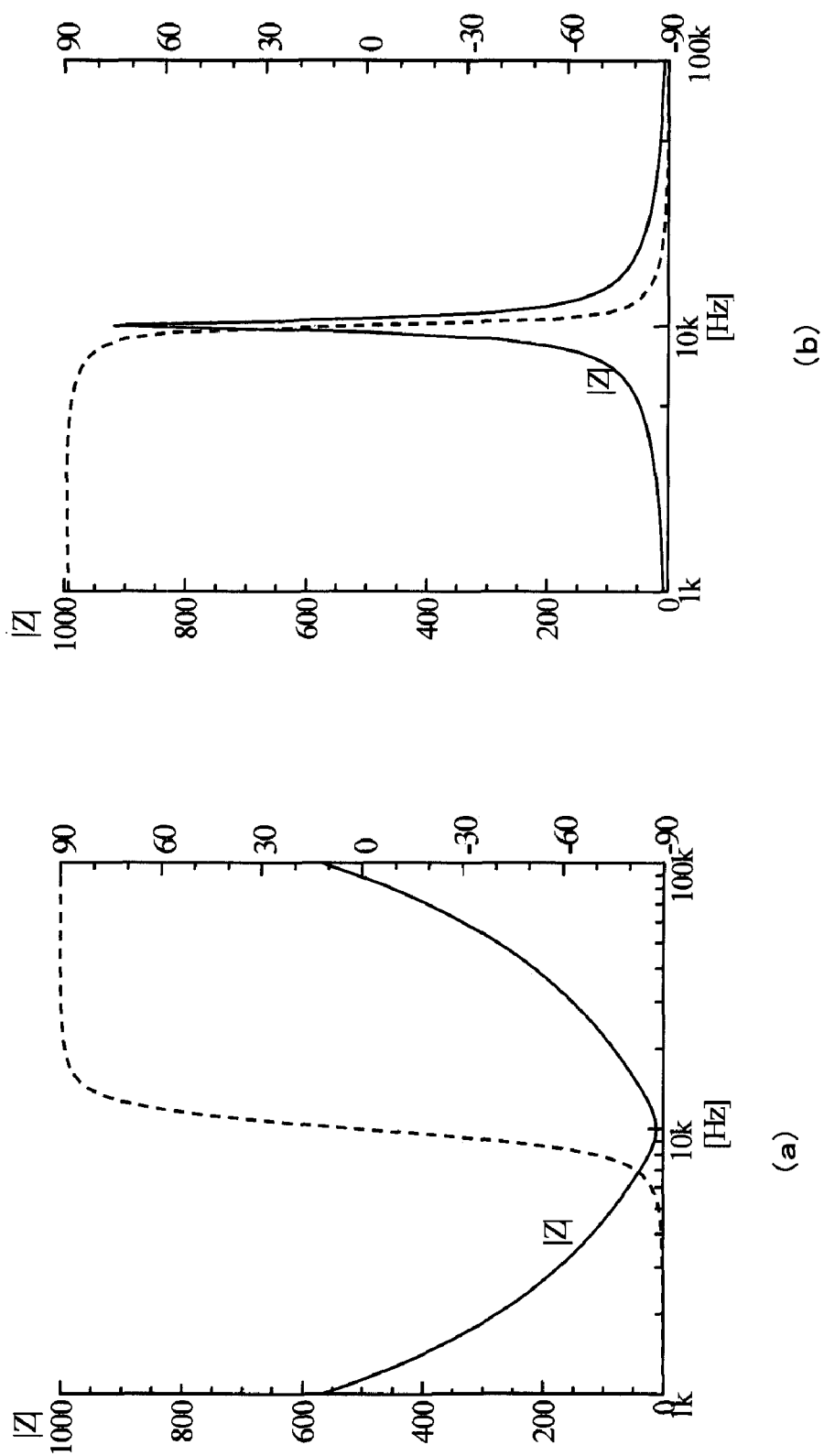

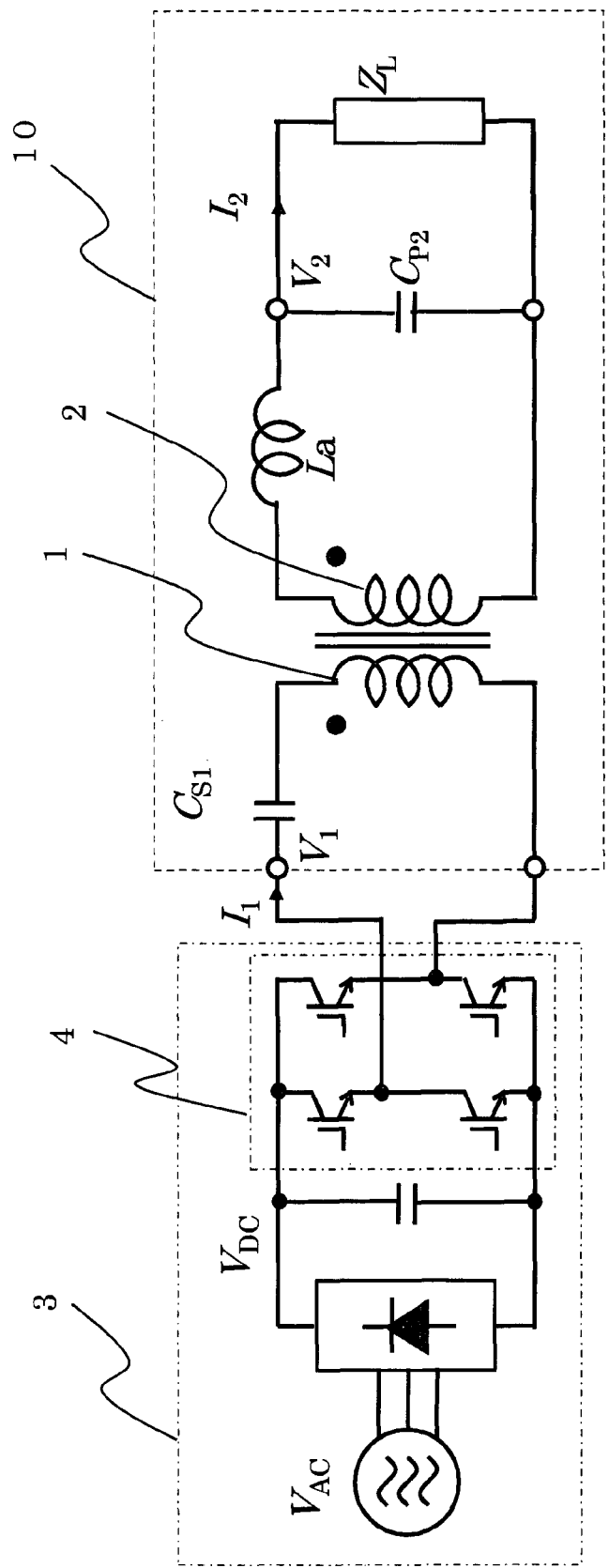
[Fig. 11]

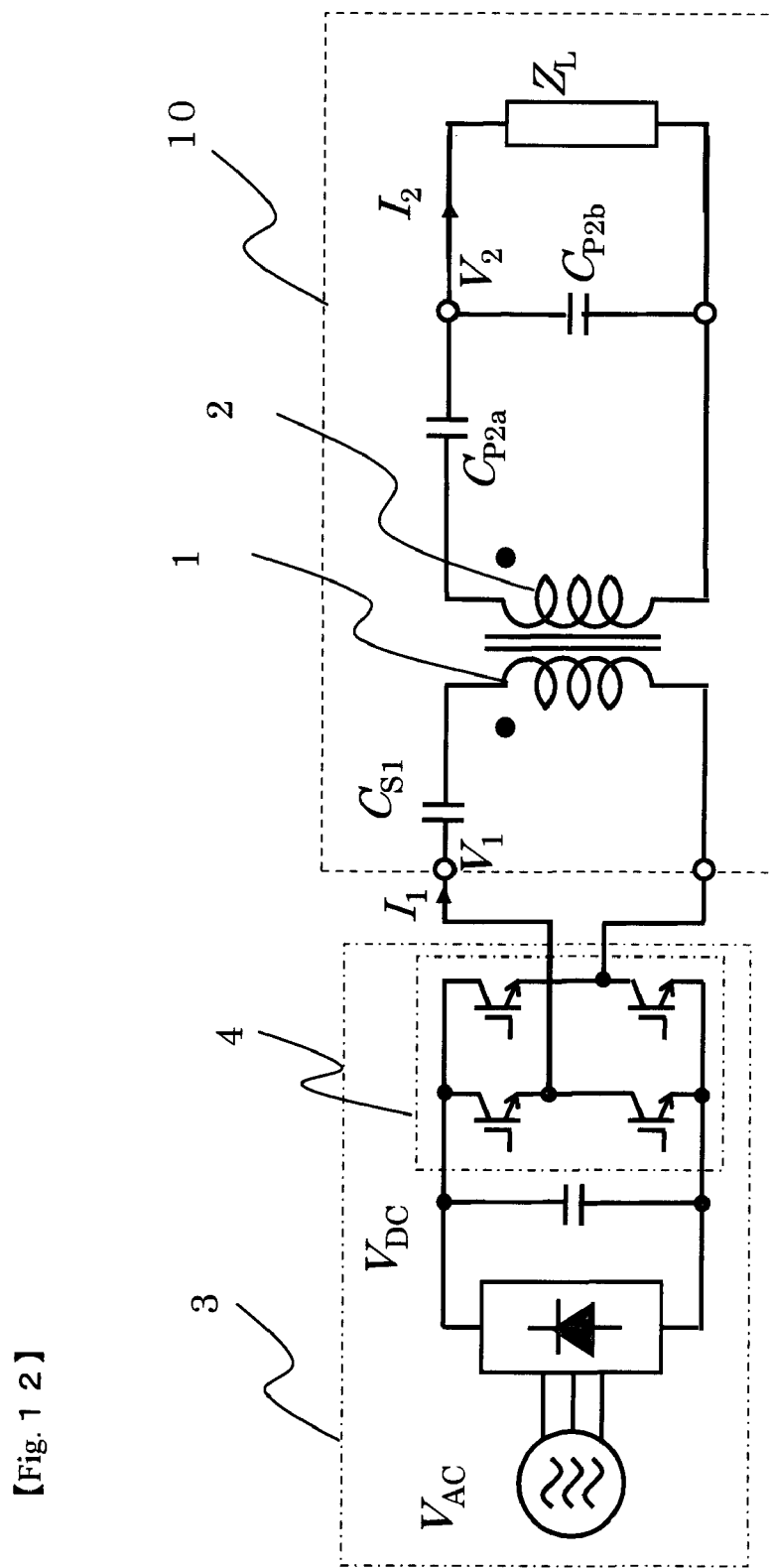
[Fig. 12]

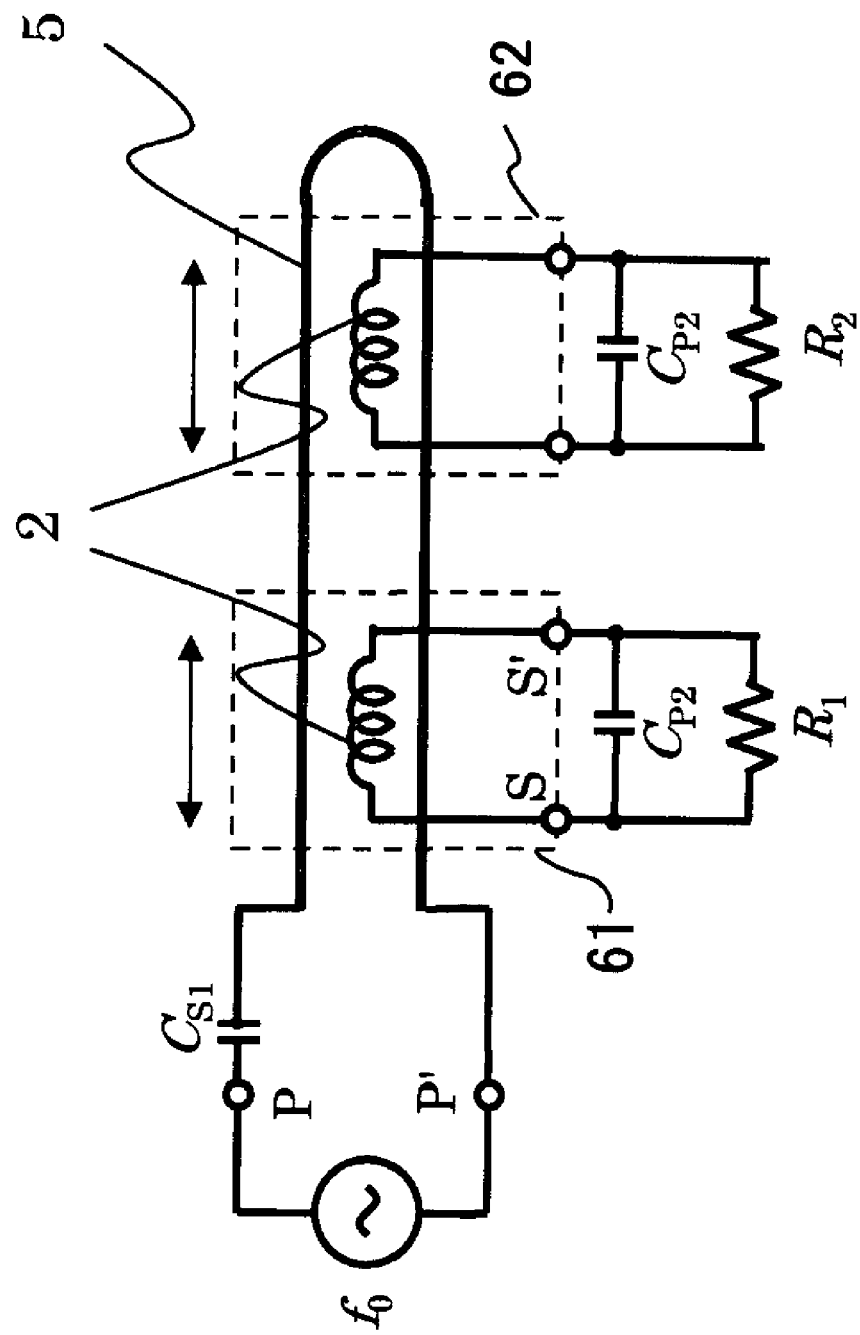
[Fig. 13]

[Fig. 14]
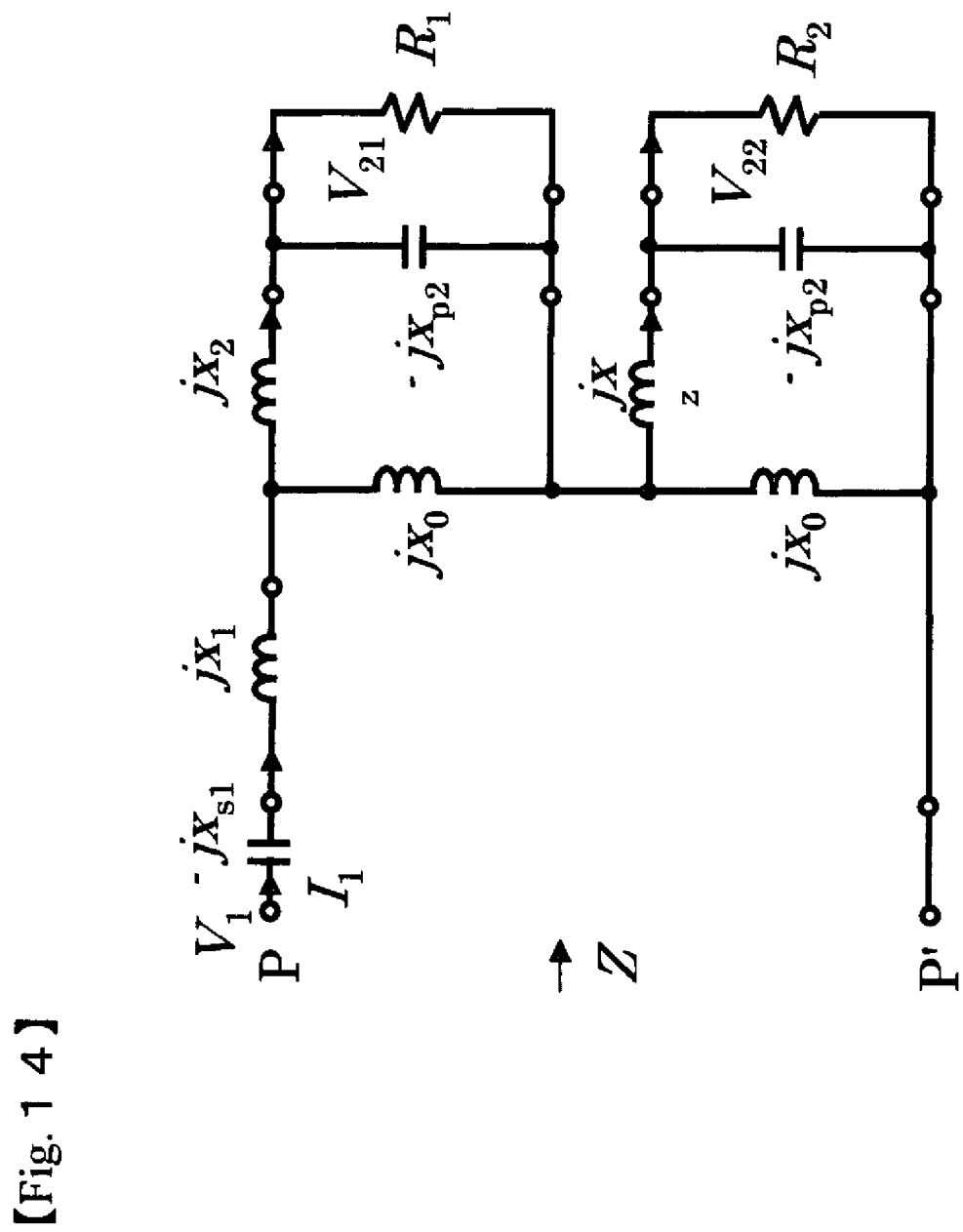

[Fig. 15]
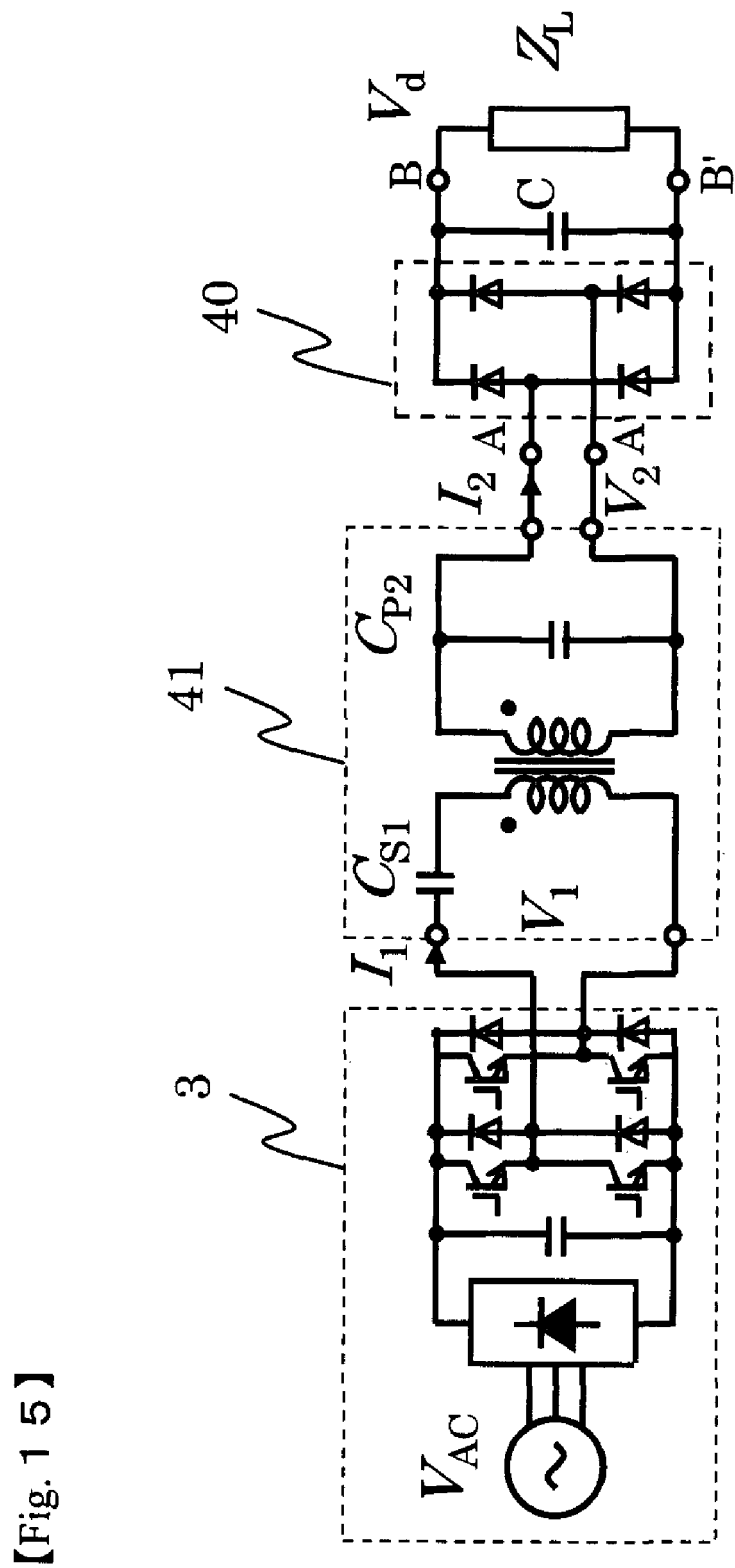

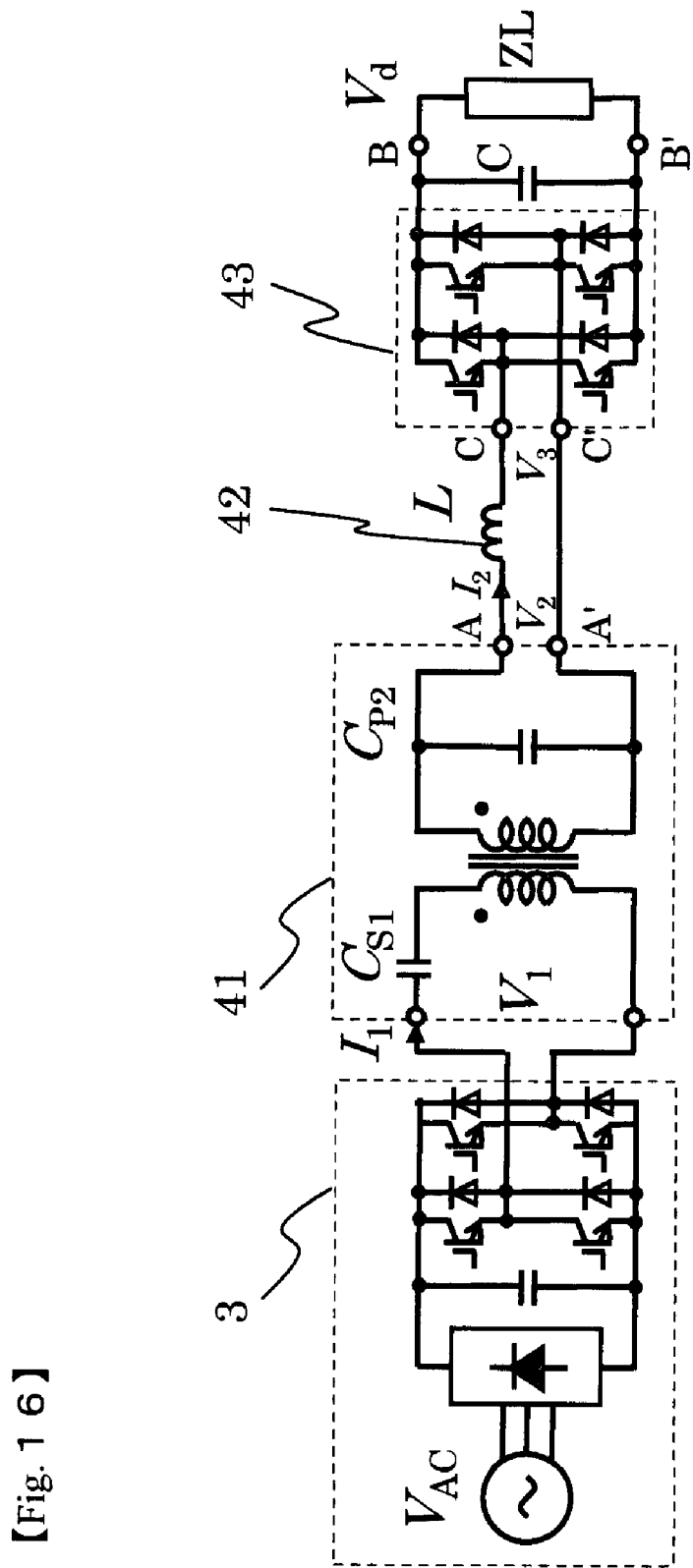
[Fig. 16]

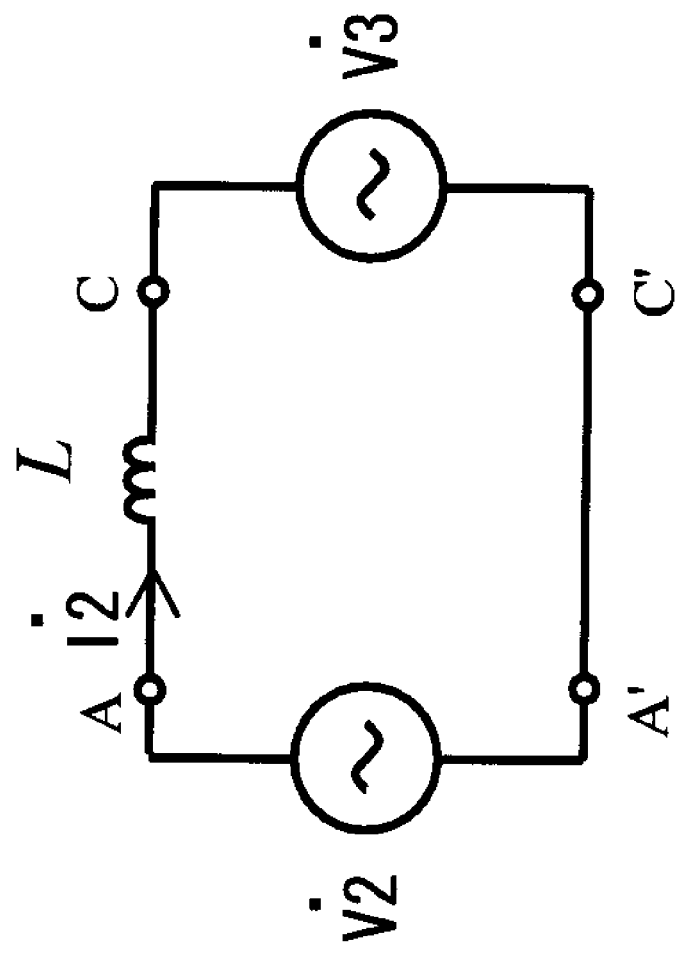
[Fig. 17]

[Fig. 18]
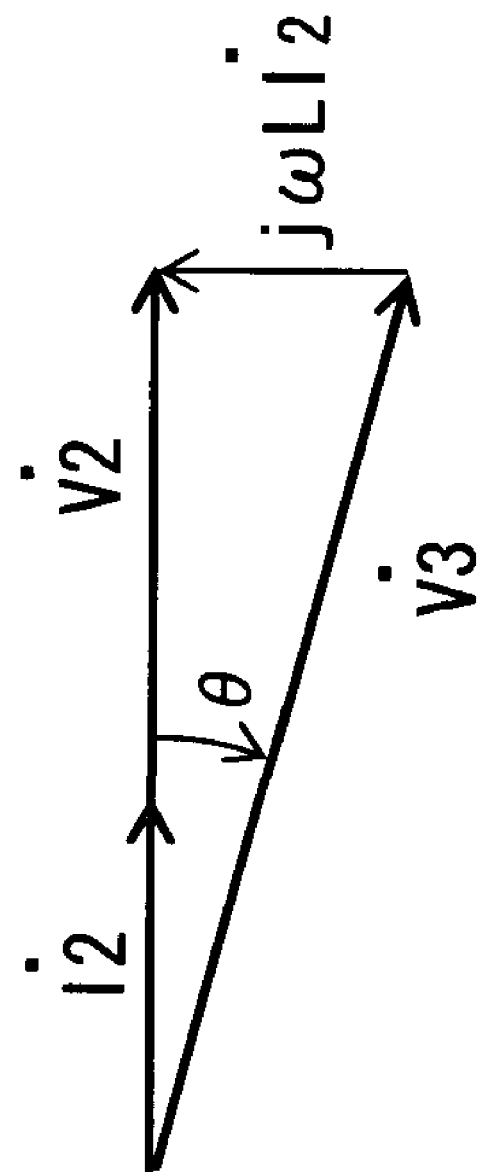

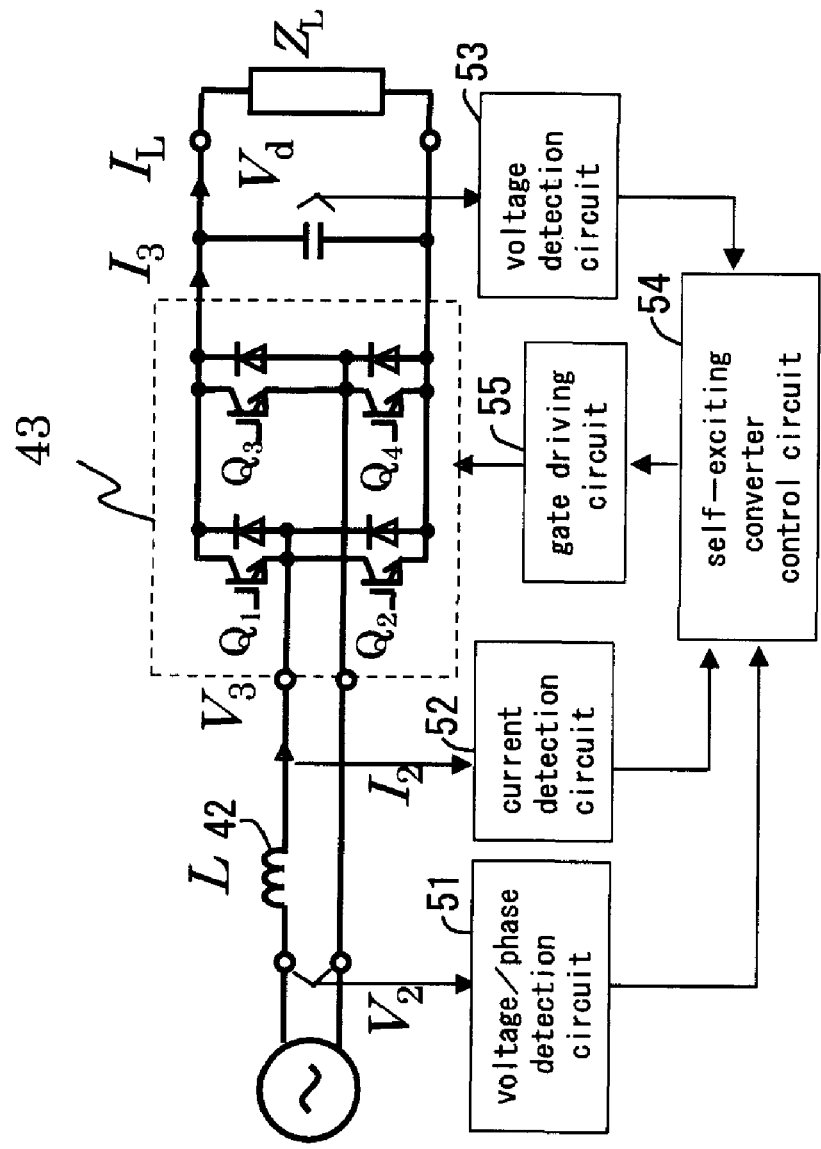
[Fig. 19]

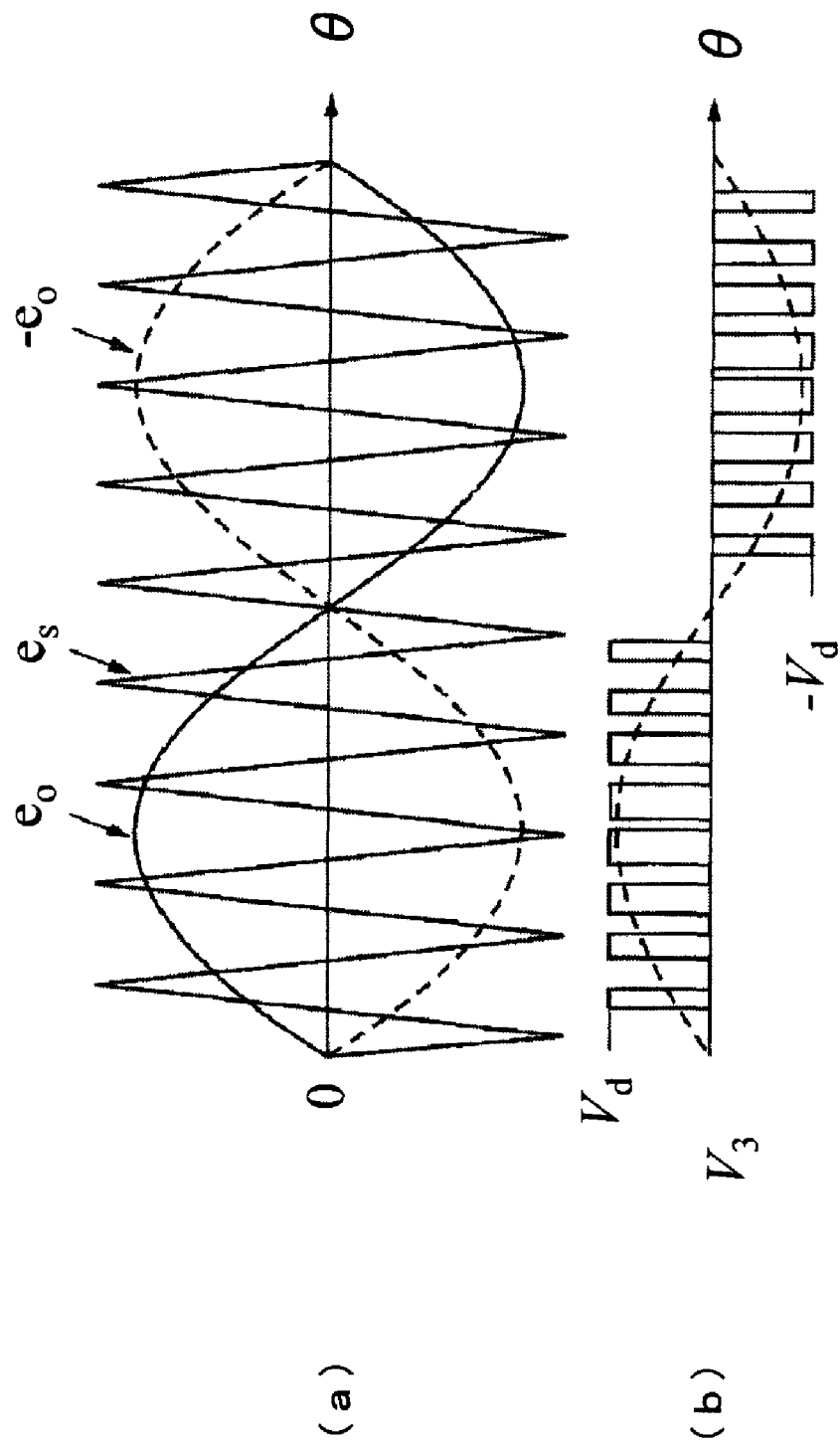
[Fig. 20]

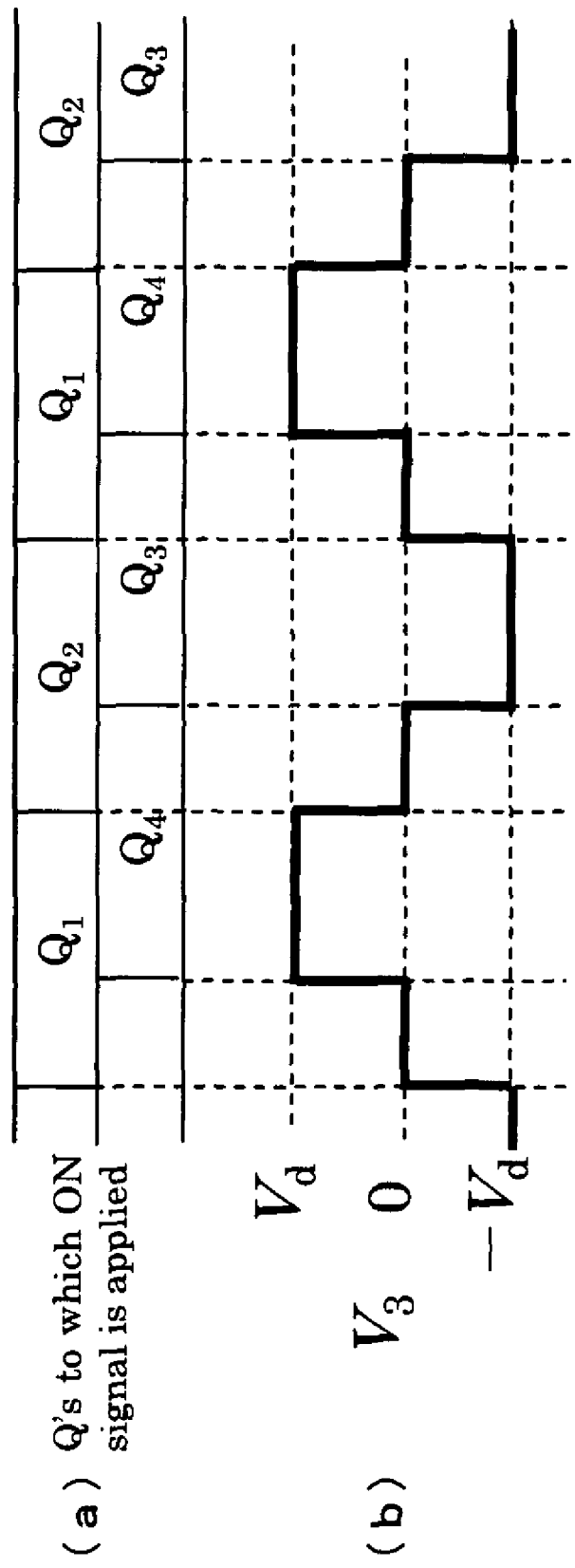
[Fig. 21]

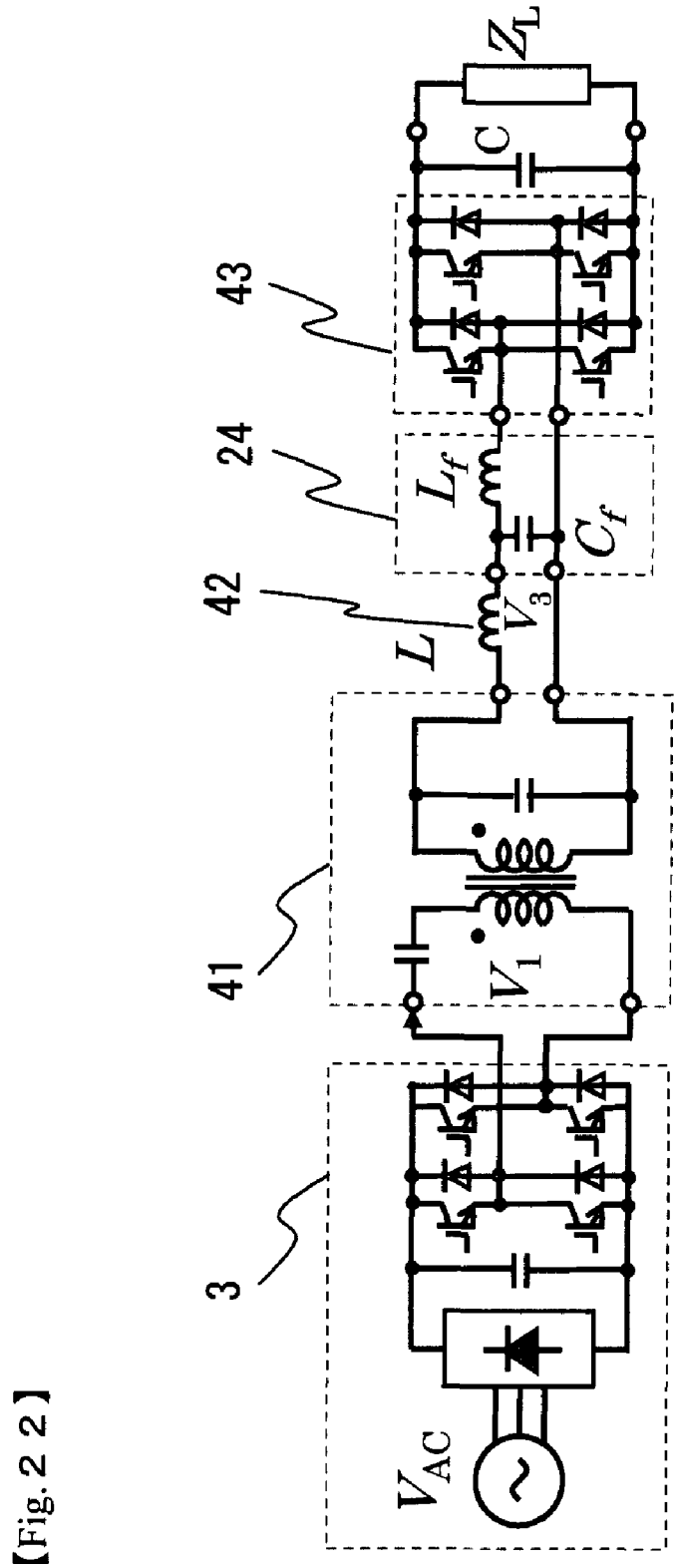
[Fig. 22]

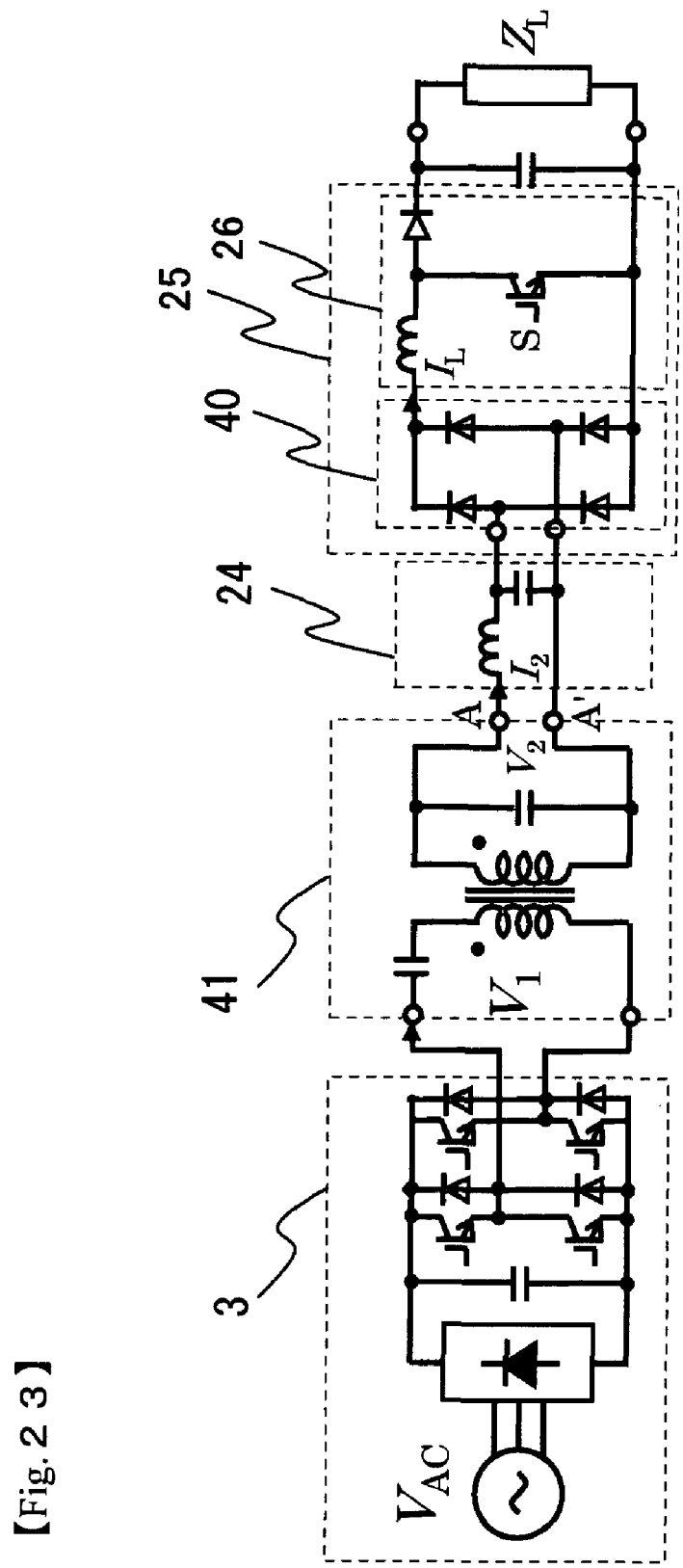
[Fig. 23]

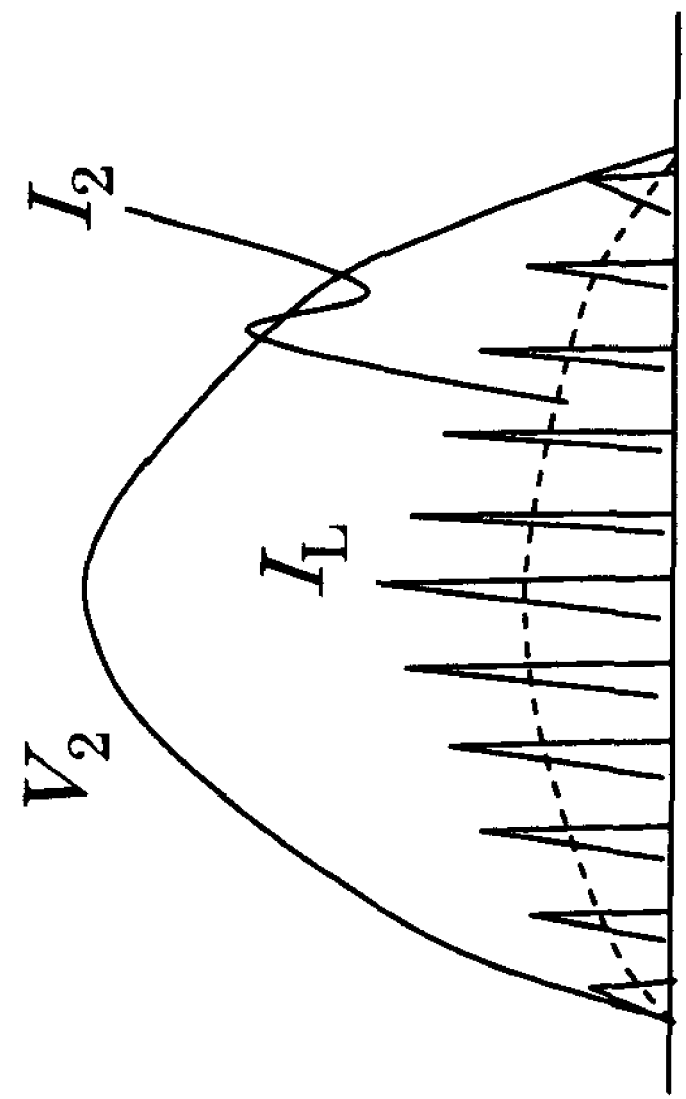
[Fig. 24]

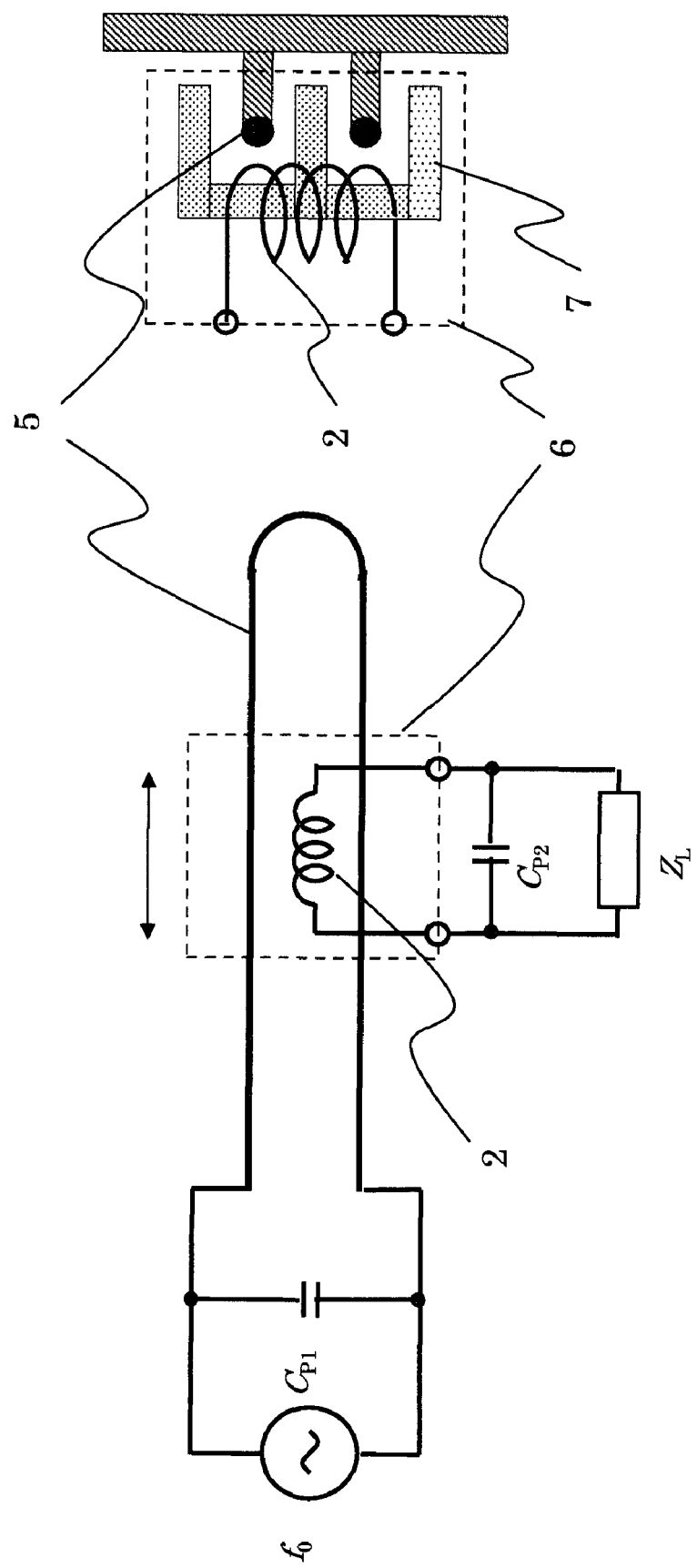
[Fig. 25] (Prior Art)

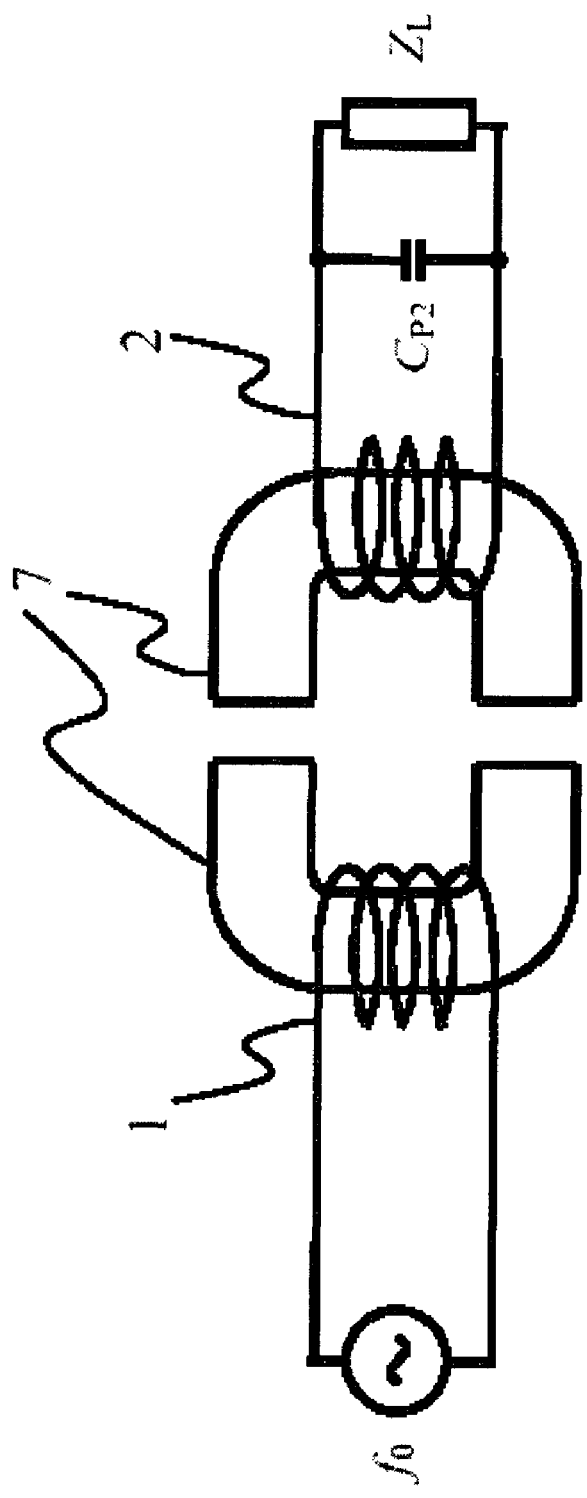
[Fig. 26] (Prior Art)

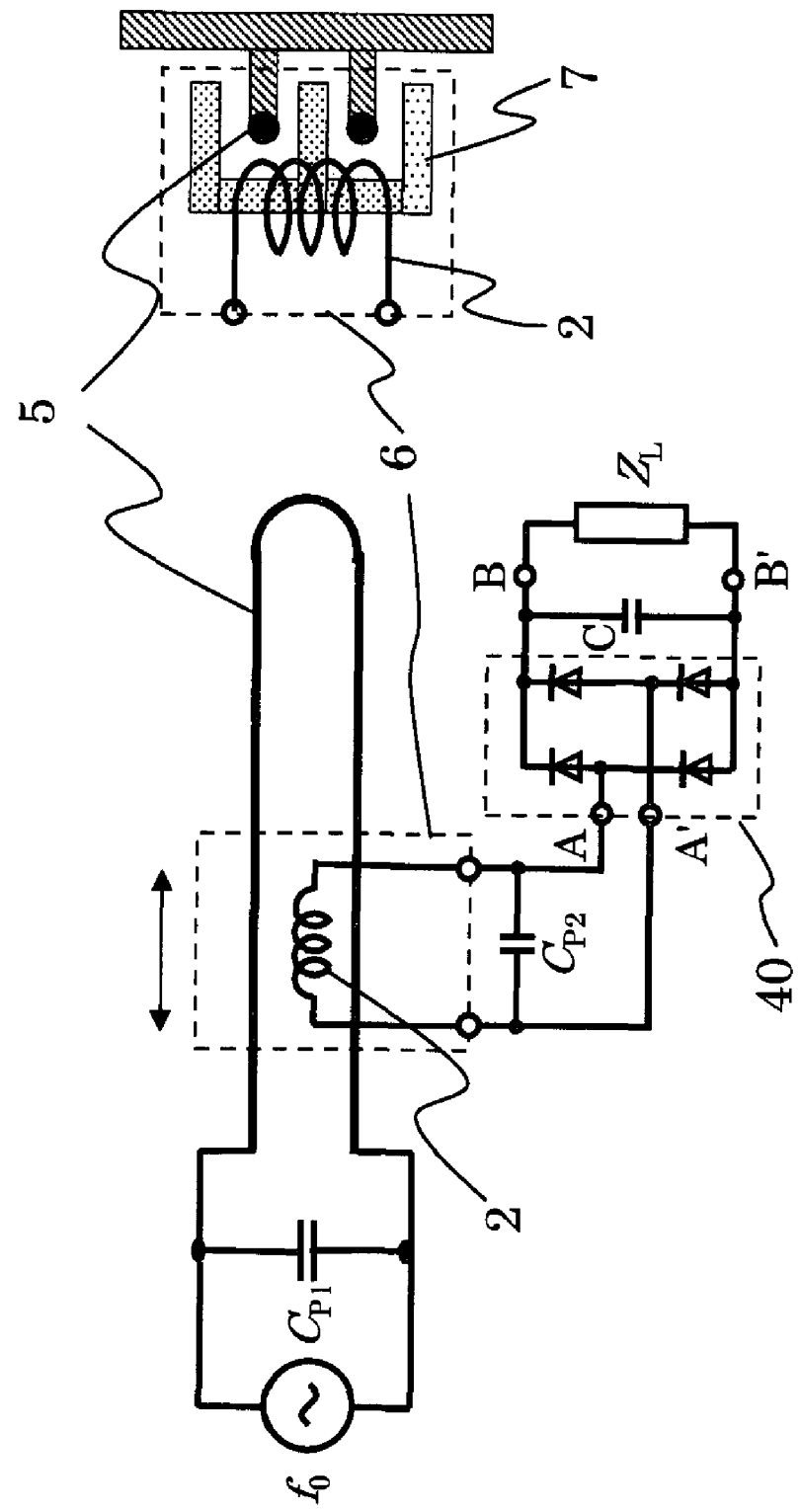
[Fig. 2 7] (Prior Art)

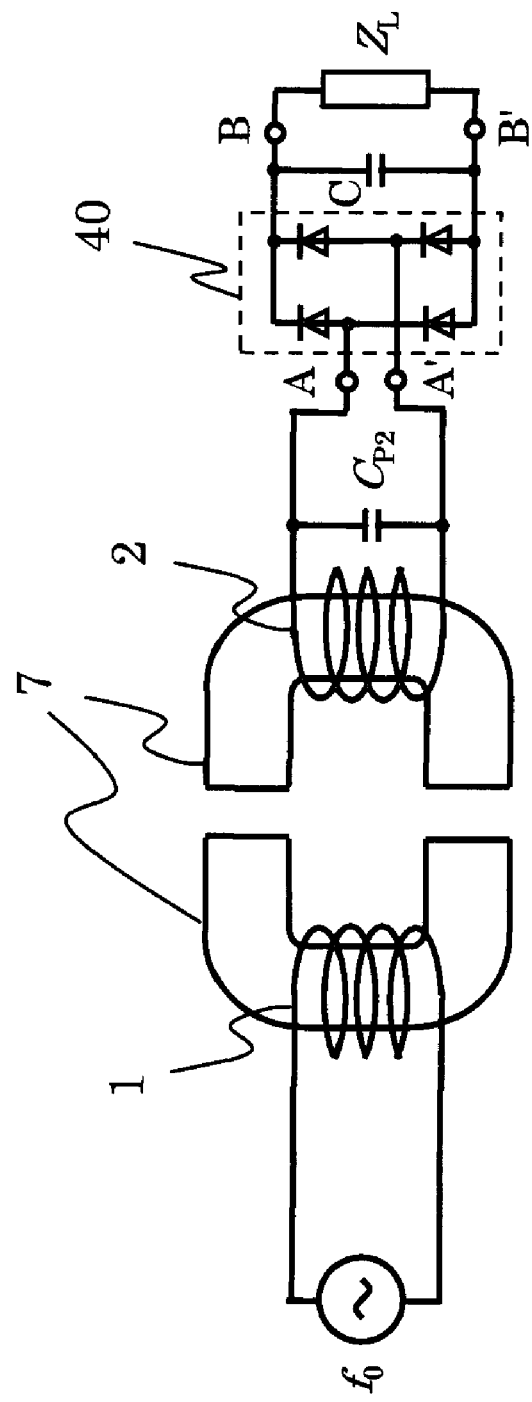
[Fig. 28] (Prior Art)

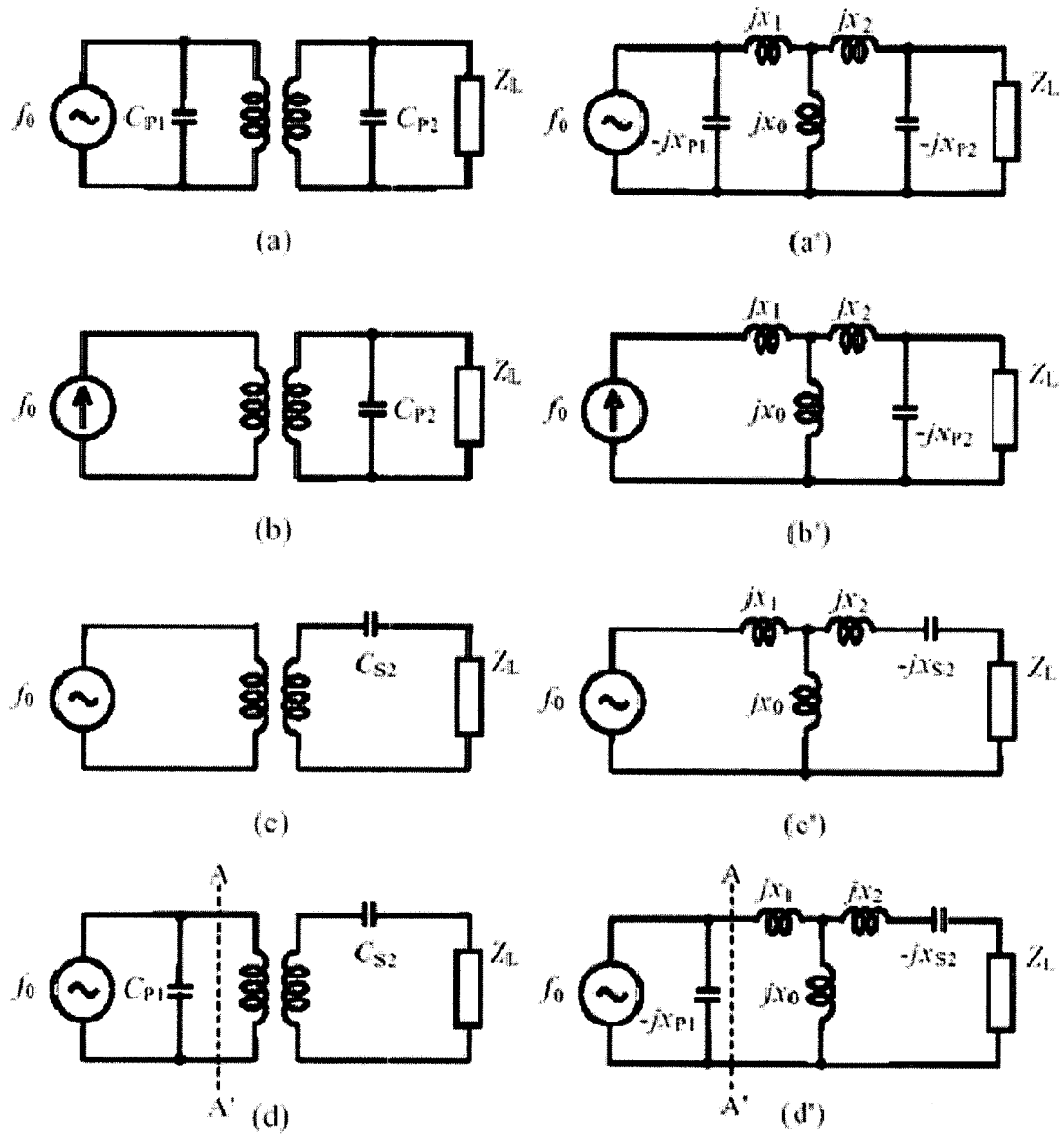
[Fig. 29] (Prior Art)

NON-CONTACT POWER FEEDER

TECHNICAL FIELD

The present invention relates to a non-contact power feeder for feeding electric power to movable objects or electrical equipment in a non-contact manner.

BACKGROUND

Non-contact power feeding to movable objects such as transportation vehicles in a manufacturing plant, elevators and the like achieves to eliminate such problems as contact wear or sparks that are common to a trolley type power feeding or cable retention or entangling problems in cable power feeding, thereby simplifying maintenance. This is one of the reasons why non-contact power feeding devices are developed and put into practical use in recent years by applying the transformer principle, wherein an electrical power is supplied to a primary winding of a transformer and power is induced in a secondary winding by the electromagnetic induction for feeding power in a non-contact manner.

FIG. 25 illustrates a device that is developed for non-contact power feeding to a movable object. This device comprises an alternating current (AC) power supply that outputs an AC power having the frequency f0, a power feeding line 5 disposed along the path of the movable object and acting as a primary winding of a transformer, a capacitor Cp1 that constitutes a parallel resonance circuit together with the primary winding and a moving assembly that comprises a pick-up 6 for acquiring power in non-contact relationship from the power feeding line 5, a secondary winding 2 held in the pick-up 6, a (magnetic) core 7 for the secondary winding 2, a load ZL of the moving assembly and a capacitor Cp2 that constitutes a parallel resonance circuit together with the secondary winding 2.

In this power feeder, power is outputted to the power feeding line 5 from the AC power supply and supplied to the load ZL of the moving assembly by way of the secondary winding 2 that is a non-contact relationship with the power feeding line 5.

Alternatively, FIG. 26 illustrates a stationary (non-moving) non-contact power feeder that is employed in a charger for codeless household electrical appliances and cellular phones. In this power feeder, a core 7 is provided for winding each of the primary winding 1 and the secondary winding 2. Power is sent by electromagnetic induction from the primary winding 1 to the secondary winding 2 that is connected to a household electrical appliance and a cellular phone.

FIG. 27 illustrates the moving assembly side in the non-contact power feeder in FIG. 25, further providing a diode rectifier 40 and a smoothing capacitor C for supplying DC power to the load ZL. In this power feeder, an AC output in the secondary winding 2 is converted into a DC power before being supplied to the load ZL.

FIG. 28 illustrates an application of the stationary non-contact power feeder in FIG. 26, wherein a diode rectifier 40 and a smoothing capacitor C are provided at the secondary winding side to be connected to a household electrical appliance or a cellular phone for supplying a DC power to the load ZL.

These non-contact power feeders can be shown in the same equivalent circuit as a transformer. However, since there is an air gap between the primary winding and the secondary winding unlike a closely coupled transformer, the coupling factor is very low and there causes a large leakage inductance. In order to solve the problem, a resonance circuit is used for improving power conversion efficiency in the conventional non-contact power feeders.

Now, a description will be made on the resonance circuit in the conventional non-contact power feeders.

It is to be noted in this specification and drawings that the number of turns of the primary winding is N1, the number of turns of the secondary winding is N2 and the winding ratio n=N1/N2.

FIG. 29 (a) is a circuit configuration of a non-contact power feeder as disclosed in the following Non-patent Document 1. Parallel resonance circuits are provided in both of the primary winding side and the secondary winding side. FIG. 29 (a') is an equivalent circuit of the circuit in FIG. 29 (a) and the transformer is shown in a T-type equivalent circuit.

It is shown in this equivalent circuit that the angular frequency of the power supply output is $\omega 0$ ($=2\pi f0$), the primary leakage reactance of the transformer in this instance is x1, the secondary leakage reactance converted to the primary side is x2 and the magnetizing reactance converted to the primary side is x0. Accordingly, if it is assumed that the primary leakage inductance is l1, the secondary leakage inductance converted to the primary side is l2 and the magnetizing inductance (mutual inductance) converted to the primary side is l0, the above x1, x2 and x0 are given by the following (Expressions 1~3):

$$x1 = \omega 0 \times l1 \quad \text{(Expression 1)}$$

$$x2 = \omega 0 \times l2 \quad \text{(Expression 2)}$$

$$x0 = \omega 0 \times l0 \quad \text{(Expression 3)}$$

On the other hand, xP1 is the capacitive reactance of the primary side capacitor when the angular frequency is $\omega 0$ ($=2\pi f0$) and xP2 is the capacitive reactance of the secondary side capacitor converted to the primary side in the same condition as mentioned above. Assuming that the capacitance of the primary side capacitor is Cp1 and the capacitance of the secondary side capacitor converted to the primary side is Cp2, xP1 and xP2 are given by the following (Expressions 4 and 5):

$$xP1 = 1/(\omega 0 \times Cp1) \quad \text{(Expression 4)}$$

$$xP2 = 1/(\omega 0 \times Cp2) \quad \text{(Expression 5)}$$

If the actual capacitance of the secondary capacitor not converted to the primary side is Cp2', it is given by the following (Expression 6):

$$Cp2' = n^2 \times Cp2 \quad \text{(Expression 6)}$$

If the magnetizing inductance (mutual inductance) not converted to the primary side is l0', there exists the relationship of the following (Expression 7):

$$l0 = n \times l0' \quad \text{(Expression 7)}$$

If the self inductance of the primary winding is L1 and the self inductance of the secondary winding not converted to the primary side is L2, there are the relationship as given by the following (Expressions 8 and 9):

$$l1 = L1 - l0 \quad \text{(Expression 8)}$$

$$l2 = (n^2 \times L2) - l0 \quad \text{(Expression 9)}$$

Where, n is the winding ratio. If the winding ratio n=1, the value not converted to the primary side and the value converted to the primary side are equal to each other.

In the system of the Non-patent Document 1, circuit parameters are set so that the capacitor in the primary side and the self inductance of the primary inductance form a resonance circuit (in such a manner that xP1=x0+x1) and similarly, the capacitor in the secondary side and the self inductance of the secondary winding form a resonance circuit (in such a manner that xP2=x0+x2).

FIG. 29 (b) shows a circuit arrangement to eliminate the resonance circuit in the primary side by using as a power supply a current source that outputs a current of the frequency f0 as is the case in a current type inverter. FIG. 29 (b') shows its equivalent circuit, wherein x1, x2, x0 and xP2 have the same meaning as those in FIG. 29 (a').

Alternatively, FIG. 29 (c) shows a circuit arrangement of a non-contact power feeder as disclosed in the following Non-patent Document 2. FIG. 29 (c') shows its equivalent circuit. This power feeder has a capacitor in the secondary side having the capacitance Cs2 converted to the primary side. The capacitive reactance xS2 of the secondary side capacitor converted to the primary side has the relationship with Cs2 given by the following (Expression 10) when the angular frequency of the power supply output is ω0 (=2πf0):

$$xS2 = 1/(\omega 0 \times Cs2) \quad \text{(Expression 10)}$$

If the capacitance of the actual secondary side capacitor not converted to the primary side is Cs2', there exists the following (Expression 11):

$$Cs2' = n^2 \times Cs2 \quad \text{(Expression 11)}$$

It is to be noted that x1, x2 and x0 in FIG. 29 (c') have the same meaning as those in FIG. 29 (a').

In the system as disclosed in the Non-patent Document 2, the magnetizing reactance x0 is neglected and the capacitance Cs2 is provided so that the primary leakage reactance x1, the secondary leakage reactance x2 and the secondary side capacitor form a series resonance circuit (that is, xS2=x1+x2).

FIG. 29 (d) shows a circuit arrangement of a non-contact power feeder as disclosed in the following Patent Document 1 and FIG. 29 (d') shows its equivalent circuit. Note that x1, x2, x0, xP1 and xS2 in FIG. 29 (d') have the same meaning as those in FIG. 29 (a') and FIG. 29 (c').

In the system of the Patent Document 1, the magnetizing reactance x0, the secondary leakage reactance x2 and the secondary side capacitor Cs2 form a series resonance circuit (that is, 1/(ω0×Cs2)=xS2=x0+x2) and moreover the capacitance of the Cp1 is chosen so that the series resonance circuit is tuned with the basic frequency of the power supply output.

In this equivalent circuit, since 1/(ω0×Cs2)=x0+x2, if the load is a resistance R (ZL=R), the impedance ZA of the circuit portion at the right of the line AA' in FIG. 29 (d') is given by the following (Expression 12):

$$ZA = x0^2/R + j(x0+x1) \quad \text{(Expression 12)}$$

Moreover, there is a description in the Patent Document 2 that if the ZA is converted into a parallel circuit of a combined load resistance R" and a combined inductance and the capacitance of the Cp1 is chosen to form a parallel resonance circuit together with the parallel circuit, the entire circuit including the Cp1 can be converted into a simple equivalent circuit and the combined load resistance R" is given by the following (Expression 13):

$$R'' = R(x0+x1)^2/x0^2 \quad \text{(Expression 13)}$$

However, as will be described hereinafter, the above (Expression 13) excludes $x0^2/R$.

Patent Document 1: JPA-2002-320347

Non-patent Document 1: A. W Green and J. T. Boys, "10 kHz Inductively Coupled Power Transfer-Concept and Control", Power Electronics and Variable-Speed Drives, 26-28 Oct., 1994, Conf. Publication No. 399, IEE Non-patent Document 2: Ayano, Nagase and Inaba, "Studies on High Efficiency Non-contact Power Feeder", Electric Academy Papers D, Vol. 123, No. 3, 2003

DISCLOSURE OF THE INVENTION

Problems for Solving by the Invention

Since the non-contact power feeder has a low coupling factor and a large leakage inductance, efforts have been made to employ a high frequency power supply, to add a series or a parallel capacitor for forming a resonance circuit, to increase the secondary voltage (i.e., output voltage) and to reduce a reactive current so that the primary input power factor approaches to 1, thereby improving the efficiency and reducing the size of the power supply and the non-contact power feeder.

Moreover, since most of the non-contact power feeders are normally used to variable loads, it is desirable to have a circuit less affected by the load fluctuation (i.e., having "load independent characteristic") as well as always high and stable efficiency.

Also, there are strong needs to establish a resonance circuit arrangement and a design concept that are applicable to all non-contact power feeders and have an excellent performance (i.e., high efficiency, high power factor and load independent characteristic).

Problems associated with the aforementioned prior art will be described from the above points of view.

In the system as shown in FIG. 29 (a) and FIG. 29 (c), the capacitance of the capacitor in the resonance circuit is determined by eliminating or simplifying a part of the equivalent circuit of the transformer as shown in FIG. 29 (a') and FIG. 29 (c'). Excellent performance is not realized except such cases wherein the transformer constants can be eliminated or simplified, thereby having a problem to lack in generalizing. It is believed to have large rooms of improving the performance.

On the other hand, the system in FIG. 29 (b) has a problem of poor power factor of the power supply output and thus low efficiency in utilizing the power supply.

In the system as shown in FIG. 29 (d), since the resonance circuit is determined without abbreviating the equivalent circuit, the input power factor is 1 in case of a resistive load (i.e., a linear load). However, there is a room of improving the way of determining the capacitance of the capacitor that forms the resonance circuit. The capacitance of the primary side capacitor Cp1 is chosen so that the series resonance circuit comprising the secondary winding (x0 and x2) and the capacitor (Cs2) resonates in tuned with the basic frequency of the power supply output in this method. According to this method, it is required to set so that the value of Cs2 satisfies the relationship 1/(ω0×Cs2)=xS2=x0+x2 and the value of Cp1 satisfies the relationship of the following (Expression 14):

$$1/(\omega 0 \times Cp1) = xP1 = x0 + x1 + x0^4/\{R^2(x0+x1)\} \quad \text{(Expression 14)}$$

This relationship is derived by calculating the impedance of the equivalent circuit in FIG. 29 (d') at the right of the power supply and finding the condition so that the j component becomes 0.

The (Expression 14) indicates that the value of Cp1 must be changed when the load resistance R varies. This means that if the load resistance r is fixed, the performance may degrade depending on the variation of the load resistance R.

If the load impedance Z seen from the power supply is calculated by substituting the values of the (Expression 12)

and the (Expression 14) in the equivalent circuit, the load impedance Z is given by the following (Expression 15):

$$Z = x0^2/R + R(x0+x1)^2/x0^2 \quad \text{(Expression 15)}$$

(As understood from the comparison between the (Expression 15) and the (Expression 13), $x0^2/R$ is missing in the description in the Patent Document 1.)

The value Z shows the characteristic different from the characteristic of an ideal transformer.

In a hope of solving the above problems associated with the prior art, it is an object of the present invention to provide a non-contact power feeder having high efficiency, high power factor and essentially no load dependent characteristics.

Means for Solving the Problems

The present invention is a non-contact power feeder for feeding power by electromagnetic induction from a primary winding driven by an AC power supply to a secondary winding disposed with an air gap between the primary winding. It further comprises a series capacitor connected in series with one of the primary and secondary windings, and a parallel capacitor connected in parallel with the other of the primary and secondary windings. The capacitance Cp of the parallel capacitor converted to the primary side is set to:

$$Cp \approx 1/\{2\pi f0 \times (x0+X)\},$$

and the capacitance Cs of the series capacitor converted to the primary side is set to:

$$Cs \approx (x0+X)/\{2\pi f0 \times (x0 \times x1 + x1 \times x2 + x2 \times x0)\},$$

where, f0 is the frequency of the AC power supply, x1 is the primary leakage reactance at the frequency f0 of the transformer comprising the primary winding and the secondary winding, x2 is the secondary leakage reactance converted to the primary side, x0 is the excitation reactance converted to the primary side and X is x1 if the parallel capacitor is connected in parallel with the primary winding or x2 if it is connected in parallel with the secondary winding.

In the non-contact power feeder according to the present invention, if $$Cs0 = (x0+X)/\{2\pi f0 \times (x0 \times x1 + x1 \times x2 + x2 \times x0)\},$$

the capacitance Cs of the series capacitor is set within the following range:

$$(1-0.4)Cs0 \leq Cs \leq (1+0.4)Cs0$$

Although the performance deteriorates as the capacitance Cs0 of the series capacitor shifts from the Cs0, it may be usable within the range of about ±40%.

Also, in the non-contact power feeder according to the present invention, when $Cp0 = 1/\{2\pi f0 \times (x0+X)\}$, the capacitance Cp of the parallel capacitor is set to the following range:

$$(1-0.4)Cp0 \leq Cp \leq (1+0.4)Cp0$$

Although the performance deteriorates as the value Cp shifts from Cp0, it may be usable in the range of about ±40%.

Another embodiment of the present invention is a non-contact power feeder for feeding power by electromagnetic induction from a primary winding driven by an AC power supply to a secondary winding disposed with an air gap between the primary winding. It further comprises a series capacitor connected in series with the primary winding, a parallel capacitor connected in parallel with the secondary winding, an inductor connected in series between the secondary winding and the parallel capacitor and a load connected in parallel with the parallel capacitor. The capacitance Cs of the series capacitor is set to:

$$Cs \approx (x0+Y)/\{2\pi f0 \times (x0 \times x1 + x1 \times Y + Y \times x0)\},$$

and the capacitance Cp of the parallel capacitor is set to form a resonance circuit with the secondary winding, where f0 is the frequency of the AC power supply, x1 is the primary leakage reactance at the frequency f0 of the transformer comprising the primary winding and the secondary winding, x2 is the secondary leakage reactance converted to the primary side, x0 is the excitation reactance converted to the primary side, xa is the reactance of the inductor converted to the primary side and Y is x2+xa.

By adding such inductor in the secondary side, it is possible to raise the secondary voltage to a desired value and the frequency characteristic of the impedance as seen the load side from the power supply can be adjusted.

A non-contact power feeder of still another embodiment of the present invention further comprises a series capacitor connected in series with the primary winding, a parallel capacitor connected in parallel with the secondary winding, a secondary side series capacitor connected in series between the secondary winding and the parallel capacitor and a load connected in parallel with the parallel capacitor. The capacitance Cs of the series capacitance is set to:

$$Cs \approx (x0+Y)/\{2\pi f0 \times (x0 \times x1 + x1 \times Y + Y \times x0)\}, \text{ and}$$

the capacitances of the parallel capacitor and the secondary side series capacitor are set so that the capacitance Cp of the overall capacitance of the parallel capacitor and the secondary side series capacitor constitutes a resonance circuit together with the secondary winding, where f0 is the frequency of the AC power supply, x1 is the primary leakage reactance at the frequency f0 of the transformer comprising the first winding and the secondary winding, x2 is the secondary leakage reactance converted to the primary side, x0 is the excitation reactance converted to the primary side and Y is x2.

By dividing the secondary side parallel capacitor into two, it is possible to decrease the secondary voltage (load voltage9 to a desired value and adjust the frequency characteristic of the load side impedance as seen from the power supply.

Also, in the non-contact power feeder according to the present invention, at least one of the primary winding and the secondary winding is wound around a core.

By winding such winding around a ferrite core or the like, it is possible to improve power feeding efficiency.

In the non-contact power feeder for feeding power by electromagnetic induction from the primary winding driven by the AC power supply to m (m>1) secondary windings of identical shape disposed with an air gap between the primary winding and comprising the series capacitor Cs connected in series with the primary winding and m parallel capacitors connected in parallel with the respective secondary windings, the capacitance Cp of the parallel capacitor connected to each secondary winding and converted to the primary is set to:

$$Cp \approx 1/\{2\pi f0 \times (x0+x2)\} \text{ and the capacitance Cs of the series capacitor is set to:}$$

$$Cs \approx (x0+x2)/\{m \times 2\pi f0 \times (x0 \times x1/m + x1 \times x2/m + x2 \times x0)\},$$

where, f0 is the frequency of the AC power supply, x1 is the primary leakage reactance at the frequency f0 of each of the m transformers comprising the primary winding and the secondary windings, x2 is the secondary leakage reactance converted to the primary side and x0 is the excitation reactance converted to the primary side.

By setting the Cp and Cs to such values, even if there are plural secondary windings, the transformer of the non-contact power feeder is substantially equivalent to an ideal transformer. Consequently, it is possible to stably operate the entire system even if there are plural secondary side pick-ups.

In the non-contact power feeder according to the present invention, the self-exciting converter is disposed through the inductor between the parallel capacitor Cp connected to the secondary winding and the load to which the DC power is outputted for controlling the power factor of the secondary AC output that is outputted to the load through the parallel capacitor by the self-exciting converter.

In case of using the self-exciting converter for converting AC into DC as defined hereinabove, it is possible to control in such a manner that the secondary side AC is outputted equivalently to the resistive load. The power factor of the power supply output is 1 in this case and the secondary side AC output voltage is constant regardless of the load if the power supply is the constant voltage source.

In the non-contact power feeder, the magnitude and the phase of the AC voltage on the AC input terminal of a self-exciting type converter are controlled based on the magnitude and the phase of the voltage of the secondary AC output as well as the magnitude of the current flowing through the inductor.

The self-exciting type converter may use either a PWM (Pulse Width Modulation) converter or a voltage type pulse width control converter.

In the non-contact power feeder according to the present invention, a PFC (Power Factor Correction) converter is disposed between the parallel capacitor Cp connected to the secondary winding and the load to which the power is supplied, thereby controlling by the PFC converter the power factor of the secondary AC output that is supplied to the load through the parallel capacitor Cp.

Even in case of using the PFC converter for converting from AC to DC in the above manner, it is possible to control so that the output of the secondary AC is equivalently a resistive load.

It is possible to use a circuit comprising a diode bridge and a step-up chopper as the PFC converter.

Advantages of the Invention

The non-contact power feeder according to the present invention has no load dependent characteristic, i.e., the capacitors Cs1 and Cp2 that form a resonance circuit do not depend on the load.

Additionally, in case of a resistive load, the power factor of the power supply output remains always 1, thereby providing high power factor and high conversion efficiency even if the load may vary. In case when the load has a reactance component, the power factor of the power supply output is always the same as the power factor of the load in the secondary side.

Moreover, since the secondary voltage and the secondary current are determined solely by the primary voltage, the primary current, the leakage reactance and the excitation reactance, it is possible to easily estimate the values in the secondary side from the primary side or vice versa, thereby making it easy to design the non-contact power feeding system.

The non-contact power feeder according to the present invention is able to stably operate the overall system even if there are plural pick-ups in the secondary side.

The non-contact power feeder according to the present invention is able to maintain the constant voltage characteristic in the secondary output as well as high power factor characteristic even if the secondary AC output is converted to DC before supplying to the load.

BRIEF DESCRIPTION OF THE DRAWINGS

FIG. 1 is a circuit configuration of the non-contact power feeder according to a first embodiment of the present invention;

FIG. 2 is an equivalent circuit of the non-contact power feeder portion in the first embodiment of the present invention;

FIG. 3 is an equivalent circuit excluding the resistance of the non-contact power feeder portion in the first embodiment of the present invention;

FIG. 4 shows a basic construction (a) and an equivalent circuit (b) of the non-contact power feeder according to the first embodiment of the present invention;

FIG. 5 is an ideal transformer circuit equivalent to the non-contact power feeder portion in the first embodiment of the present invention;

FIG. 6 is waveforms showing the performance of the feeder in the first embodiment of the present invention;

FIG. 7 is a circuit construction of the non-contact power feeder according to a second embodiment of the present invention;

FIG. 8 is an equivalent circuit of a power feeder portion excluding a resistor of the feeder in the second embodiment of the present invention;

FIG. 9 is a basic construction (a) and an equivalent circuit (b) of the non-contact power feeder according to the second embodiment of the present invention;

FIG. 10 shows (a) the frequency characteristic (a) of the impedance Z as seen from the power supply of the feeder in the first embodiment of the present invention and (b) the similar frequency characteristic of the feeder of the second embodiment;

FIG. 11 is a circuit configuration of the non-contact power feeder according to a third embodiment of the present invention;

FIG. 12 is a circuit configuration of the non-contact power feeder according to a fourth embodiment of the present invention;

FIG. 13 is a movable type non-contact power feeder according to a sixth embodiment of the present invention;

FIG. 14 is an equivalent circuit of the non-contact power feeder portion in a sixth embodiment of the present invention;

FIG. 15 is an equivalent circuit in case of converting an output voltage from a transformer having a resonance circuit into DC voltage before being supplied to a load;

FIG. 16 is a circuit configuration of the non-contact power feeder according to the sixth embodiment of the present invention;

FIG. 17 is an equivalent circuit of a circuit portion adjacent to the inductor in the sixth embodiment of the present invention;

FIG. 18 is a vector diagram to show the relationship between the AC voltage and current in the non-contact power feeder portion in the sixth embodiment of the present invention;

FIG. 19 is a control circuit schematic of a PWM converter in the sixth embodiment of the present invention;

FIG. 20 is a drawing to describe how to control the PWM converter in the sixth embodiment of the present invention;

FIG. 21 is a drawing to describe how to control a voltage type pulse width control converter in the sixth embodiment of the present invention;

FIG. 22 is a circuit configuration in case of inserting a low pass filter in the non-contact power feeder in the sixth embodiment of the present invention;

FIG. 23 is a circuit configuration of the non-contact power feeder in a seventh embodiment of the present invention;

FIG. 24 is a drawing to describe how to control a PFC converter in the seventh embodiment of the present invention;

FIG. 25 illustrates a conventional movable non-contact power feeder;

FIG. 26 illustrates a conventional stationary non-contact power feeder;

FIG. 27 illustrates a conventional movable non-contact power feeder for supplying DC power;

FIG. 28 illustrates a conventional stationary non-contact power feeder for feeding DC power; and FIG. 29 illustrates a basic configuration and an equivalent circuit of a conventional non-contact power feeder.

DESCRIPTION OF REFERENCE NUMERALS 1 primary winding
2 secondary winding
3 high frequency AC power supply
4 voltage type inverter
5 feeding line
6 pick-up
7 core
8 rectifier
9 square wave output inverter
10 non-contact power feeder portion
24 low pass filter
25 PFC converter
26 step-up chopper
31 rectifier
32 smoothing capacitor
40 diode rectifier
41 transformer having resonance capacitor
42 inductor
43 self-excitation converter
51 voltage/phase detection circuit
52 current detection circuit
53 voltage detection circuit
54 self-excitation converter control circuit
55 gate driving circuit
61 pick-up
62 pick-up
Cs1 primary side serried capacitor
Cp2 secondary side parallel capacitor
Cp1 primary side parallel capacitor
Cs2 secondary side series capacitor
Cp2a secondary side parallel capacitor
Cp2b secondary side parallel capacitor
I1 primary current
I2 secondary current converted to primary side
La inductor
V1 primary voltage
V2 secondary voltage converted to primary side
$V_{AC}$ three-phase AC power source
ZL load
r0 excitation resistance (iron loss) converted to primary side
r1 resistance of primary winding
r2 resistance of secondary winding converted to primary side
x0 exciting reactance converted to primary side
x1 primary leakage reactance
x2 secondary leakage reactance converted to primary side
xP1 reactance of primary parallel capacitor
xP2 reactance of secondary parallel capacitance (converted to primary side)
xS1 reactance of primary side series capacitor
xS2 reactance of secondary side series capacitor (converted to primary side)

BEST MODE OF IMPLEMENTING THE INVENTION

First Embodiment

FIG. 1 illustrates a circuit configuration of the non-contact power feeder in a first embodiment of the present invention.

This power feeder comprises a high frequency AC power supply 3 and a non-contact power feeder portion 10 for supplying electric power outputted from the high frequency power supply 3 in a non-contact manner. The high frequency AC power supply 3 comprises a three-phase AC power supply $V_{AC}$ a rectifier 31 for rectifying the three-phase AC, a smoothing capacitor 32 and a voltage type inverter 4 for generating high frequency voltage using the rectified current and supplies AC in the range of several Hz to 100 kHz to the non-contact power feeder portion 10. Moreover, the non-contact power feeder portion 10 comprises a primary winding 1 and a secondary winding 2 of a transformer, a primary side capacitor Cs1 connected in series with the primary winding 1, a secondary side capacitor Cp2 connected in parallel with the secondary winding 2 and a load ZL to which electrical power is supplied.

As well known in the art, the voltage type inverter 4 comprises four main switches constituting an IGBT (Insulated Gate Bipolar Transistor) or the like and four return path diodes (not shown) each connected to each of the main switches. The main switches are ON/OFF controlled so as to provide a square wave or a generally sine wave output from the inverter. It is to be noted that the return path diodes are abbreviated in FIG. 1 (the same is true in FIG. 11 and FIG. 12).

FIG. 2 is an equivalent circuit of the non-contact power feeder portion 10 in which the transformer is shown in a T-type equivalent circuit. In this equivalent circuit, V1 is the primary side input voltage, I1 is the input current, xS1 is the capacitive reactance of the primary side capacitor Cs1, r1 is the winding resistance (copper loss) of the primary winding 1, x1 is the primary leakage reactance, x2 is the secondary leakage reactance converted to primary side, r2 is the winding resistance of the secondary winding converted to primary side, x0 is the excitation reactance converted to the primary side, r0 is the resistance representing the iron loss of the transformer converted to the primary side, xP2 is the capacitive reactance of the secondary side capacitor Cp2 converted to the primary side, V2 is the output voltage converted to the primary side and I2 is the output current converted to the primary side.

If the winding resistances r1 and r2 and the resistance r0 representing the iron loss are sufficiently smaller as compared to the leakage reactance x1, x2 and the excitation reactance x0, i.e., r1<<x1, r2<<x2 and r0<<x0, the winding resistances r1, r2 and the iron loss r0 in the equivalent circuit in FIG. 2 can be neglected and the equivalent circuit can be as shown in FIG. 3. FIG. 4 shows the basic construction (a) in this case and the equivalent circuit (b) in a format for comparison with the conventional configurations.

In this non-contact power feeder, the capacitor Cs1 in series with the primary winding 1 and the capacitor Cp2 in parallel with the secondary winding 2 are included and the value of the capacitor Cp2 is set to form a resonance circuit together with the self-inductance of the secondary winding 2. That is, in the equivalent circuits as shown in FIG. 3 or FIG. 4 (b), Cp2 is determined by the following (Expression 16):

$$1/(\omega 0 \times Cp2) = xp2 = x0 + x2 \quad \text{(Expression 16)}$$

Moreover, the value of Cs1 is set by the following (Expression 17) so that the impedance of the right side of the power supply in the equivalent circuit in FIG. 3 or FIG. 4 (b) is 0 in the j component:

$$1/(\omega 0 \times Cs1) = xS1 = (x0 \times x1 + x1 \times x2 + x2 \times x0) \quad \text{(Expression 17)}$$

In this way, the load impedance Z as seen from the power supply in FIG. 3 or FIG. 4 (b) is given by the following (Expression 18):

$$Z = \{x0/(x0+x2)\}^2 \times ZL \quad \text{(Expression 18)}$$

If ZL=R, the above (Expression 18) can be modified to read as the following (Expression 19):

$$Z = \{x0/(x0+x2)\}^2 \times R \quad \text{(Expression 19)}$$

The equivalent circuit of the transformer including the capacitors Cs1 and Cp2 is equivalent to an ideal transformer having the winding ratio a as shown in FIG. 5 equal to a=x0/(x0+x2).

This means that V1 and I1 are given by the following (Expression 20) and (Expression 21), respectively:

$$V1 = a \times V2 \quad \text{(Expression 20)}$$

$$I1 = (1/a) \times I2 \quad \text{(Expression 21)}$$

As shown in the above (Expression 16) and (Expression 17), the values of Cs1 and Cp2 are determined solely by the reactance of the transformer and independent from the load.

Since no j component is included in the above (Expression 19), in case of a resistive load (ZL=R), the power factor of the output from the power supply 3 remains always 1 regardless of any change in the load. Moreover, as apparent from the above (Expression 18), the power factor of the output from the power supply is always the same as that of the load in the secondary side.

Also, as apparent from the above (Expression 20) and (Expression 21), since the secondary voltage V2 and the secondary current I2 are determined solely by the primary voltage V1, the primary current I2 and the winding ratio a, it is possible to easily estimate the values in the secondary side from the primary side or vice versa. If the power supply (inverter 4) is a constant voltage source, the power supply as seen from the secondary side is also a constant voltage source. Similarly, if it is a constant current source, the power supply as seen from the secondary side is also a constant current source. This simplifies the design of the non-contact power feeder. This is particularly advantageous in applications where the load tends to largely vary.

Additionally, since currents flowing through each winding and the capacitors can be calculated using simple mathematical expressions, it is possible to easily estimate how to increase the overall efficiency by decreasing loss of particular parts in the circuit, thereby easily making countermeasures for improving efficiency.

FIG. 6 illustrates measurement results to show characteristics of the non-contact power feeder. Illustrated in FIG. 6 are waveforms of the primary voltage V1, the primary current I1, the secondary voltage V2 and the secondary current I2 in the circuit configuration as shown in FIG. 1 while the primary voltage V1 is constant and the load resistance R is changed to 50Ω, 100Ω and 200Ω. The primary voltage V1 is shown as a square wave with 50V/div in the vertical axis, the primary current I1 is shown as a sine wave with 2.00 A/div in the vertical axis, the secondary voltage V2 is shown as a sine wave with 50V/div in the vertical axis and the secondary current is also a sine wave.

As understood from the measurement results, the secondary voltage is substantially constant, phases of all of the voltages and currents are unchanged and the input power factor is equal to substantially 1 regardless of the change in the load resistance R. This confirms that the use of the resonance circuits according to the present invention achieves "an ideal transformer characteristic".

It is to be noted that the aforementioned characteristics apply in the case where the winding resistances r1, r2 and the resistance r0 representing the iron loss are respectively sufficiently smaller than the leakage reactance x1, x2 and the excitation reactance x0 (i.e., r1<<x1, r2<<x2 and r0<<x0). In non-contact power feeder, it is normal to employ a litz wire and a ferrite core that have less increase of loss in high frequencies. This means that the winding resistances and the iron loss have sufficiently smaller influence upon the voltage and current characteristics between the primary and secondary circuits.

Although the value of Cs1 and the value of Cp2 are determined from the (Expression 17) and (Expression 16) herein, there is a case that the power feeder is usable with certain deterioration even if the values shift by ±40% from the values that are determined by the above (Expression 16) and (Expression 17).

If the values of Cs1 and Cp2 shift from the values determined by the above (Expression 16) and (Expression 17), it is general that the resonance frequency of the resonance circuit changes. If the resonance frequency of the resonance circuit may shift from the frequency f0 of the AC power supply, the secondary output voltage V2, the efficiency and the power factor of the power supply output in the non-contact power feeder decrease even if the primary input voltage V1 is constant. Since the size of the non-contact power feeder and the AC power supply generally depends on the (efficiency× power factor), it is necessary that the resonance frequency of the resonance circuit does not largely shift from the frequency of the AC power supply.

Let the value of the (efficiency×power factor) be "A" in case of using the values for Cs1 and Cp2 as determined by the (Expression 16) and (Expression 17), the (efficiency×power factor) in the actual power feeder must be at least 50% of A or higher.

Experiments prove that if the frequency shift of the resonance circuit is ±20% or lower, the (efficiency×power factor) is 50% or higher in most cases.

Since the resonance frequency is generally inversely proportional to the root of the capacitance of the capacitor, if the value of Cs1 shifts by ±40% or less from the value determined by the (Expression 17) and if the value of Cp2 shifts by ±40% or less from the value determined by the (Expression 16), there are a certain case that the power feeder is usable with certain deterioration in performance. On the other hand, if the frequency shifts over ±40%, an expected performance can never be achieved.

The output of the high frequency AC power supply 3 may be either a square wave or a sine wave. However, a sine wave is effective because electromagnetic noise can be reduced. It is also possible to interpose a filter between the high frequency AC power supply 3 and the non-contact power feeder portion 10 in order to suppress electromagnetic noise. A current type inverter may be employed as the inverter 4 in the high frequency power supply 3. As generally practiced in order to improve efficiency of the non-contact power feeder, a litz wire is preferably used for the windings to be wound around a ferrite core.

In case where the load ZL is not a resistive load, a capacitor or a reactor may be added in the primary side in either parallel or series for improving power factor. Since the load is normally inductive, the power factor can be improved by adding a power factor compensation capacitor.

For example, if ZL=R+jXL, the (Expression 18) suggests that the load impedance Z as seen from the power supply is given by the following (Expression 22) at the frequency of the AC power supply:

$$Z=a^2 \times (R+jXL) \quad \text{(Expression 22)}$$

Accordingly, if a capacitor CL having the value given by the following (Expression 23) is added in series with the series capacitor Cs1 for the primary winding 1, the load impedance Z as seen from the power supply includes only a resistive component as given by the following (Expression 24) and the power factor of the power supply output is equal to 1.

$$1/(\omega 0 \times CL) = xCL = a^2 \times XL \quad \text{(Expression 23)}$$

$$Z = a^2 \times R \quad \text{(Expression 24)}$$

Alternatively, it is possible in this case to integrate the added capacitor CL and the series capacitor Cs1 into a single capacitor.

Second Embodiment

In a second embodiment of the present invention, a description will be made on a non-contact power feeder in which the capacitors in the primary and secondary sides in the first embodiment are interchanged.

FIG. 7 shows a circuit configuration of this power feeder. The power feeder comprises a high frequency AC power supply 3 and a sine wave output inverter 9 as high frequency voltage generation means of the high frequency AC power supply 3. A non-contact power feeder section 10 comprises a primary side capacitor Cp1 connected in parallel with the primary winding 1 and a secondary side capacitor Cs2 connected in series with the secondary winding 2. The other configuration remains the same as the first embodiment (FIG. 1).

FIG. 8 is an equivalent circuit of the non-contact power feeder section 10 excluding the winding resistances r1, r2 and the iron loss r0. FIG. 9 illustrates (a) the basic configuration and (b) the equivalent circuit in this embodiment in a form convenient for comparison with prior art. It is to be noted herein that xP1 is the capacitive reactance of the primary side capacitor Cp1 and xS2 is the capacitive reactance of the secondary side capacitor Cs2 converted to the primary side.

In this non-contact power feeder, the value of the primary side parallel capacitor Cp1 is determined to form a parallel resonance circuit with the self-inductance of the primary winding and given by the following (Expression 25):

$$1/(\omega 0 \times Cp1) = xP1 = x0+x1 \quad \text{(Expression 25)}$$

On the other hand, the value of the secondary side series capacitor Cs2 is determined by the following (Expression 26) so that the impedance of the equivalent circuit in FIG. 8 or FIG. 9 (b) at the right side of the power supply is 0 in the component including j:

$$1(\omega 0 \times Cs2) = xS2 = (x0 \times x1 + x1 \times x2 + x2 \times x0)/(x0+x1) \quad \text{(Expression 26)}$$

Then, the impedance Z of the load as seen from the power supply in FIG. 8 or FIG. 9 (b) is given by the following (Expression 27):

$$Z = \{(x0+x1)/x0\}^2 \times ZL \quad \text{(Expression 27)}$$

Moreover, if ZL=R, the above (Expression 27) can be modified to the following (Expression 28):

$$Z = \{(x0+x1)/x0\}^2 \times R \quad \text{(Expression 28)}$$

This suggests that the equivalent circuit of the transformer including the capacitors Cp1 and Cs2 is equivalent to the ideal transformer having the winding ratio a=(x0+x1)/x0 as shown in FIG. 5. Accordingly, the above relationships of (Expression 20) and (Expression 21) are effective similar to the first embodiment.

As apparent from (Expression 25) and (Expression 26), the values of the capacitors Cp1 and Cs2 are determined solely by the reactance of the transformer and independent from the load.

Since no j-component is included in $\{(x0+x1)/x0\}^2$, in case of a resistive load (i.e., ZL=R), the power factor of the output of the power supply 3 remains always 1 even if the load may vary. Also, as apparent from the (Expression 28), the power factor of the output of the power supply 3 is always the same as that of the load in the secondary side even in case of a load including a reactance component.

Additionally, the secondary voltage V2 and the secondary current I2 are determined solely by the primary voltage V1, the primary current I1 and the winding ratio a, thereby providing the similar advantages as the first embodiment and enabling to easily estimate the values in the secondary side from the primary side or vice versa.

It is also true in this case that the winding resistances r1, r1 and the resistance r0 representing the iron loss are sufficiently smaller than the leakage reactance x1, x2 and the excitation reactance x0, respectively (i.e., r1<<x1, r2<<x2 and r0<<x0) because it is normal in the non-contact power feeder to use a litz wire and a ferrite core that have smaller increase of loss at high frequencies. This means that the winding resistances and the iron loss have a small influence on the voltage and current characteristics between the primary and secondary circuits.

There is a certain case that the non-contact power feeder is usable with certain deteriorated performance even if the values of Cp1 and Cs2 shift from those in the (Expression 25) and (Expression 26) by about ±40%.

It is to be noted that the basic configuration (a) and the equivalent circuit (b) in FIG. 9 (a) and FIG. 9 (b) are the same as those of the Patent Document 1 as shown in FIG. 29 (d) and (d'). However, values of the capacitors Cp1 and Cs2 are different and their characteristics are also different.

That is, in this power feeder, values of the capacitors Cp1 and Cs2 are determined respectively by the (Expression 25) and (Expression 26) and do not depend on the load. On the other hand, in the Patent Document 1, values of Cs2 and Cp1 are determined respectively by 1/(ω0×Cs2)=xS2=x0+x2 and the (Expression 14), thereby depend on the load.

Moreover, the load impedance Z as seen from the power supply is given by the (Expression 27) and has the characteristics of the ideal transformer. On the other hand, in the Patent Document 1, the load impedance Z as seen from the power supply is given by the (Expression 15), thereby not having the characteristics of the ideal transformer.

As described hereinabove, although this embodiment of the power feeder has the winding ratio different from that of the first embodiment, it exhibits the characteristics of the ideal transformer and thus can be chosen depending on particular applications.

Although the second embodiment and the first embodiment look similar to each other at a glance, they have significant differences. The second embodiment and the first embodiment are completely different in the frequency characteristic of the load impedance Z as seen from the load (i.e., of the non-contact power feeder section 10). FIG. 10 (*a*) shows the frequency characteristic of Z in the first embodiment (i.e., the circuit in FIG. 1), while FIG. 10 (*b*) shows the frequency characteristic of Z in the second embodiment (i.e., the circuit in FIG. 7). In these drawings, the solid line shows |Z| with the scale of the left vertical axis. On the other hand, the dotted line shows the phase with the scale of the right vertical axis. The horizontal axis represents the frequency in logarithm.

Since impedance decreases at the resonance frequency in the first embodiment, the currents I1 and I2 become sine waves as shown in FIG. 6 even if it is driven by a square wave output inverter. On the contrary, the impedance is large at the resonance frequency in the second embodiment. If driven by a square wave output inverter, considerable amount of currents other than the resonance frequency flows and the current waveform is far from a sine wave and the performance is not good. Accordingly, it is not preferable to be driven by a square wave output inverter and it must be driven by a sine wave output inverter. Practically, it is necessary to use the sine wave output inverter 9 as shown in FIG. 7 or to interpose a tuning filter in front of the non-contact power feeder section 10. This means that the first embodiment is totally better than the second embodiment because it requires smaller number of components and thus higher in efficiency.

Third Embodiment

Now, described is a third embodiment of the non-contact power feeder according to the present invention in which an inductor La is added to the secondary side in the first embodiment in order to vary the secondary voltage V2.

FIG. 11 illustrates the circuit configuration of this power feeder. An inductor La is added to the secondary side in this power feeder. Other configuration is the same as the first embodiment (FIG. 1).

Assuming that the reactance of the inductor La converted to the primary side is xa, it is given by the following (Expression 29):

$$xa = \omega 0 \times La \quad \text{(Expression 29)}$$

The equivalent circuit of the non-contact power feeder section 10 is the same as the equivalent circuits in FIG. 2-FIG. 4 except that the secondary leakage reactance x2 converted to the primary side is increased by xa, i.e., (x2+xa). Accordingly, the value of Cp2 is determined by the following (Expression 30) that is equal to the (Expression 16) for the first embodiment except replacing x2 by (x2+xa):

$$1/(\omega 0 \times Cp2) = xP2 = x0 + (x2+xa) \quad \text{(Expression 30)}$$

This is nothing but the value of the capacitor Cp2 that is set to form a resonance circuit together with the secondary winding 2 and the inductor La at the frequency of the AC power supply 3.

On the other hand, the value of Cs1 is determined by the following (Expression 31) by substituting x2 in the (Expression 17) for the first embodiment with (x2+xa):

$$1/(\omega 0 \times Cs1) = xS1 = \{x0 \times x1 + x1 \times (x2+xa) + (x2+xa) \times x0\}/\{x0+(x2+xa)\} \quad \text{(Expression 31)}$$

Then, the impedance Z of the load as seen from the power supply in FIG. 11 is given by the following (Expression 32):

$$Z = \{x0/(x0+x2+xa)\}^2 \times ZL \quad \text{(Expression 32)}$$

The equivalent circuit of this transformer is equivalent to the ideal transformer with the winding ratio a=x0/(x0+x2+xa) and the secondary voltage V2 is given by the following (Expression 33):

$$V2 = V1 \times (1 \cdot a) = V1 \times (x0+x2+xa)/x0 \quad \text{(Expression 33)}$$

As apparent from the foregoing, the secondary voltage V2 can be increased to a desired value depending on the value of the added inductor La. In addition thereto, it is possible to adjust the frequency characteristic of the impedance Z as seen from the power supply.

It is to be noted that the power feeder may be usable even if the values of Cp2 and Cs1 shift from those given by the above (Expression 30) and (Expression 31) by about ±40%.

Fourth Embodiment

In a fourth embodiment of the present invention, a description will be made on a non-contact power feeder in which the secondary side capacitor in the first embodiment is divided to change the setting of the secondary voltage (load voltage) V2.

FIG. 12 illustrates a circuit configuration of this power feeder. In this power feeder, the secondary side parallel capacitor Cp2 in the first embodiment (FIG. 1) is divided into two capacitors, Cp2*a* and Cp2*b* and the load ZL is disposed in parallel with the parallel capacitor Cp2*b*. The other configuration remains the same as that in the first embodiment.

These capacitors Cp2*a* and Cp2*b* are chosen so that the total capacitance of the series connection is equal to that of Cp2, i.e., setting to the value as given by the following (Expression 34):

$$1/Cp2 = (1/Cp2a) + (1/Cp2b) \quad \text{(Expression 34)}$$

The values of Cp2 as given by the above (Expression 34) and the series capacitor Cs1 in FIG. 12 are determined respectively by the above (Expression 16) and (Expression 17) just like the first embodiment.

By dividing the parallel capacitor into two in the above manner, it is possible to decrease the secondary voltage (load voltage) V2 to any desired value and also to adjust the frequency characteristic of the impedance of the load Z as seen from the power supply.

It is to be noted that the power feeder is possibly usable with certain deteriorated performance even if the values of Cp2 and Cs1 shift from those given by the above (Expression 16) and (Expression 17) by about ±40%.

Fifth Embodiment

In a fifth embodiment of the present invention, a description will be made on a non-contact power feeder having plural secondary sides.

In a movable non-contact power feeder, there are certain cases where m (m>1) pick-ups are provided in the secondary side as shown in FIG. 13. In the example as shown in FIG. 13, m is equal to 2 (m=2) and the secondary side comprises a pick-up 61 for feeding power to a resistive load R1 and a pick-up 62 for feeding power to a resistive load R2. It is assumed herein that R1≠R2 but both pick-ups 61, 62 have the same shape. Accordingly, the parallel capacitors Cp2 connected in parallel with the secondary windings in the pick-ups 61, 62 have the same capacitance to each other.

FIG. 14 shows an equivalent circuit for the circuit portion at the right side of the lines PP' in FIG. 13. It is to be noted that winding resistances and the iron loss are neglected herein for simplicity.

In this power feeder, the capacitance value of the parallel capacitor that is connected to each pick-up 61, 62 is set by the following (Expression 35) to form a resonance circuit together with the self-inductance of the secondary winding in each pick-up 61, 62:

$$Cp2=1/\{2\pi f0\times(x0+x2)\} \quad \text{(Expression 35)}$$

And the capacitance of the series capacitor Cs1 to be connected to the primary winding is set so that the power factor of the AC power supply in FIG. 13 is 1, i.e., the impedance in the equivalent circuit as shown in FIG. 14 has no j component. In case of providing m secondary side loads, Cs1 is given by the following (Expression 36):

$$Cs1=(x0+x2)/\{m\times2\pi f0\times(x0+x1/m+x1\times x2/m+x2\times x0)\} \quad \text{(Expression 36)}$$

By setting Cp2 and Cs1 as described hereinabove, the load impedance Z as seen from the power supply in FIG. 13 is given by the following (Expression 37):

$$Z=\{x0/(x0+x2)\}^2\times(R1+R2) \quad \text{(Expression 37)}$$

This is similar to the (Expression 19) in case of having a single secondary side and the ideal transformer characteristics are achieved in case of series connection of resistors (R1+R2) in the secondary side. Accordingly, on assuming that the voltages applied to the resistors R1 and R2 are respectively V21 and V22 and the primary power supply is a constant voltage source, the sum of the secondary side voltages (V21+V22) is constant regardless of the value (R1+R2).

It is to be noted, however, that there are the following relationship between R1-R2 and the voltages V21-V22:

$$V21:V22=R1:R2$$

If one of the resistors is significantly large (for example, a light load), the voltage for the other resistor significantly drops. As a result, it is necessary to take certain measures such as shortening (R=0) the larger resistor.

As apparent from the above (Expression 37), in case where there are m secondary side loads, Z is given by the following expression:

$$Z=\{x0/(x0+x2)\}^2\times(R1+R2+\ldots+Rm)$$

The unique feature of the present invention is that the capacitance values of Cs1 and Cp2 do not depend on the load, thereby achieving the "ideal transformer characteristic" for all of the secondary side loads. Accordingly, the voltage distribution in the secondary side is easily understood and easy to take the necessary measures in case of any trouble.

It is to be noted that the power feeder may be usable with deteriorated performance to some extent even if the capacitance values for Cp2 and Cs1 shift from the values determined by the above (Expression 35) and (Expression 36) by about ±40%.

Sixth Embodiment

In a sixth embodiment, a description will be made on a non-contact power feeder for feeding power by converting the AC output on the secondary winding into a DC voltage.

In case where a load to which power is supplied from the non-contact power feeder is a linear load (i.e., a load to flow a sine wave current upon supplying a sine wave voltage) such as a resistive load and an inductive load, the transformer is substantially equivalent to the ideal transformer in the configurations as shown in the first through fifth embodiments. As a result, if the primary side power supply is a constant voltage source (i.e., an AC supply where the AC voltage is independent from the load current), the secondary side AC output remains constant even if the load may vary or the number of pick-ups 61, 62 in FIG. 13 may change. Also, the secondary side power factor is always the same as that of the secondary side load. Particularly, if the load is a resistive load, the output power-factor of the power source is always 1 regardless of variation in the load value.

However, in case of converting the secondary side AC output into a DC voltage by a diode rectifier as shown in FIG. 27 and FIG. 28, the load including the diode rectifier 40 becomes a non-linear load, thereby losing the excellent characteristics such as the constant voltage characteristic of the secondary side output, high power factor characteristic and the like when it is applied to the configurations in the first through fifth embodiments.

FIG. 15 is an illustration to describe the application of the first embodiment to the power feeder in FIG. 27 or FIG. 28. The secondary side AC output of the non-contact power feeder as shown in FIG. 1 is converted into a DC voltage by a diode rectifier 40 and supplied to a load ZL. The transformer, the series capacitor Cs1 and the parallel capacitor Cp1 are integrally referred to as a transformer with resonance capacitor 41.

The secondary side AC voltage that is supplied to the diode rectifier 40 from the transformer with resonance capacitor 41 is V2, the secondary current is I2 and the DC voltage converted by the diode rectifier 40 and set to be substantially constant by a smoothing capacitor C is Vd. Then, the diodes in the diode rectifier 40 become ON only for a time period when the absolute value of the secondary side AC voltage V2 is larger than the DC voltage Vd. Accordingly, the secondary current I2 is intermittent and thus the load including the diode rectifier 40 is a non-linear load. In this case, even if the primary side power supply may be a constant voltage source, no constant voltage characteristic is achieved in the secondary side output, thereby disabling to maintain a high power-factor of the power supply output.

However, this problem can be solved by setting the right side of the line AA' in FIG. 15 is equivalent to a resistor that is a linear load. In other words, if the capacitor Cp2 of the transformer with resonance capacitor 41 is set to the value as determined by the (Expression 16) and the capacitor Cs1 is set as given by the (Expression 17), the secondary side AC voltage V2 becomes substantially a sine wave. This suggests the use of a rectifier circuit wherein the secondary side AC current I2 is in phase with the voltage V2.

FIG. 16 illustrates a non-contact power feeder according to this embodiment. This power feeder comprises a high frequency AC power supply 3, the transformer with resonance capacitor 41, an inductor 42, a self-exciting converter 43, the smoothing capacitor C and a load ZL. The self-exciting converter 43 is interposed between the transformer with resonance capacitor 41 and the load ZL through the inductor 42.

As compared with the configuration in FIG. 15, the non-contact power feeder differs from FIG. 15 in that the inductor 42 and the self-exciting converter 43 replace the diode rectifier 40.

The self-exciting converter 43 comprises four main switches and four return diodes connected in parallel with the main switches. Each of the return diodes is connected in such a manner to flow a reverse current from the emitter to the collector of each main switch. Each main switch comprises such device as a self-arc suppressing IGBT, a MOSFET, a GTO thyristor, a power transistor or the like, thereby providing commutation in the converter.

It is to be noted that the self-exciting converter 43 is a voltage type self-exciting converter. As well known in the art, the self-exciting inverter is able to perform a reverse conversion from DC to AC (i.e., inverter operation) as well as a forward conversion from AC to DC (i.e., converter operation) by reversing the power flow. The self-exciting inverter that is performing the converter operation is also known as a "self-exciting converter". However, it is decided to uniformly refer to as the "self-exciting converter" in this specification.

Now, it is assumed that the secondary side AC voltage between AA of the transformer with resonance capacitor 41 is V2, the secondary side AC current flowing through the inductor 42 is I2, the AC voltage between the AC input terminals CC' of the self-exciting converter 43 is V3, and the DC voltage converted to DC by the self-exciting converter 43 and set to substantially constant voltage by the smoothing capacitor C is Vd. The secondary side AC voltage V2 becomes substantially sine wave by setting the capacitor Cp2 of the transformer with resonance capacitor 41 to the value given by the above (Expression 16) and the capacitor Cs1 to the value given by the above (Expression 17). It is assumed that the frequency of the sine wave is f0 and its angular frequency is $\omega 0$ ($=2\pi \times f0$).

The self-exciting converter 43 controls the switching timing of the main switches in order to maintain the DC voltage Vd constant and also to make the secondary side AC current I2 and the secondary side AC voltage V2 sine waves of the same phase.

The amplitude and the phase of the secondary side AC current I2 can be varied by controlling the magnitude and the phase of the AC voltage V3 on the AC input terminals CC' of the self-exciting converter 43. This aspect will be described with reference to FIG. 17 and FIG. 18.

FIG. 17 is an equivalent circuit to indicate the AC voltages V2 and V3 to be applied to the inductor (42) L and the secondary side AC current I2 flowing through the inductor L. The AC voltage V3 is shown herein as an AC voltage inversely converted from the DC voltage Vd by the self-exciting converter 43. As described hereinafter, the fundamental wave of this AC voltage V3 can be brought closer to the sine wave of the frequency f0 by proper switching control of the main switches. It is understood from the equivalent circuit that the secondary side AC current I2 that flows through the inductor L determines magnitude and phase of the AC voltage V2 and the AC voltage V3. It is to be understood that the secondary side AC current I2 can be controlled by changing the AC voltage V3 so as to change the voltage (V2-V3) that is applied across the inductor L, FIG. 18 is a vector diagram of the circuit in FIG. 17. The vector ($j\omega 0LI2$) representing the voltage drop across the inductor L is shown to have the magnitude $\omega 0LI2$ and perpendicular to the vector V2 of the AC voltage V2. If the combined vector of the vector V3 of the AC voltage V3 and the vector ($j\omega 0LI2$) coincides with the vector V2, i.e., if the following (Expression 38) is true:

$$V2 = j\omega 0LI2 + V3$$ (Expression 38)

Then, I2 and V2 have the same phase.

Accordingly, if the self-exciting converter 43 is used and if it is controlled in such a manner that the AC voltage V3 has magnitude and phase as shown in FIG. 18, the secondary side AC current I2 is in-phase with the secondary side AC voltage V2. Then, the power-factor of the AC output is 1 and the right side of AA, in FIG. 16 is equivalent to a resistive load.

FIG. 19 illustrates a control circuit for the self-exciting converter 43. This control circuit comprises a voltage/phase detection circuit 51 for detecting voltage and phase of the secondary side AC voltage V2, a current detection circuit 52 for detecting the secondary side AC current I2 flowing through the inductor 42, a voltage detection circuit 53 for detecting the converted DC voltage Vd, a self-exciting converter control circuit 54 for generating switching signals for the main switches Q1, Q2, Q3 and Q4 based on the detected values and a gate driving circuit 55 for driving the main switches Q1, Q2, Q3 and Q4 based on the switching signals.

The self-exciting converter control circuit 54 generates the switching signals by, for example, a PWM (Pulse Width Modulation) method. As illustrated in FIG. 20 (a), in the PWM method, the sine wave (signal wave) e0 and a triangle carrier wave es are compared and the switching signals for the main switches Q1, Q2, Q3 and Q4 are outputted at cross points of the sine wave and the carrier wave. The switching signals ON-OFF controls the main switches Q1~Q4 in the following sequence:

(1) Q1, Q3: ON, Q2, Q4: OFF
(2) Q2, Q3: ON, Q1, Q4: OFF
(3) Q2, Q4: ON, Q1, Q3: OFF
(4) Q1, Q4: ON, Q2, Q3: OFF

Pulses having a pulse width equal to the time period when the amplitude of the sine wave is larger than the that of the carrier wave (or inversely when the amplitude of the sine wave is smaller) are outputted to the AC input terminals CC' of the self-exciting converter 43.

A series of pulses form quasi-sine wave as shown in FIG. 20 (b). The amplitude and the frequency of the sine wave can be varied by changing the number of pulses, the pulse interval and the pulse width.

The self-exciting converter control circuit 54 compares the DC voltage Vd detected by the voltage detection circuit 53 with a predetermined value and calculates the amplitude of the current to be supplied from the AC power supply in order to maintain the voltage of the smoothing capacitor C to a predetermined value from the voltage deviation. Then, generated is a current instruction value that is in-phase with the AC voltage V2 detected by the voltage/phase detection circuit and has the amplitude I. The instruction value of the AC voltage V3 is calculated so that the current I2 that is detected by the current detection circuit 52 follows the current instruction value. The switching signals for the main switches Q1, Q2, Q3 and Q4 is generated by the PWM method while making the instruction value as the signal wave.

In the aforementioned sequence, the self-exciting converter 43 is controlled so that the DC voltage Vd is maintained constant and power-factor of the secondary side AC output is equal to 1.

If the primary side power supply is a constant voltage source in this non-contact power feeder, the secondary voltage V2 remains substantially constant even if the secondary current I2 may increase. Even if the number of the secondary side load may be more than 1, the sum of the secondary voltages V2 is substantially constant independent from the load power.

It is to be noted that the converter employing the PWM method is known as a PWM converter and normally used in case of connecting to a commercial frequency (50 Hz or 60 Hz) power supply and requiring power regeneration. The PWM converter features high power factor and low harmonic currents.

The non-contact power feeder according to this particular embodiment employs the PWM converter and thus exhibiting the aforementioned features as well an additional feature of "maintaining the secondary AC output voltage regardless of any change of the load if the high frequency power supply is a constant voltage source".

However, since frequency f0 of the high frequency power supply 3 is high, i.e., 1 kHz-100 kHz in the non-contact power feeder, frequency of the signal wave e0 of the PWM converter as shown in FIG. 20 (a) is the same as f0 and frequency of the carrier wave es must be chosen to have ten times or higher than such frequency. As a result, operation frequency of the semiconductor switches Q1~Q4 becomes very high.

In order to reduce the operation frequency of the semiconductor switches Q1~Q4, the PWM converter should be replaced by a voltage type pulse width control converter. In the voltage type pulse width control converter, the semiconductor switches Q1~Q4 to which an ON signal is applied are switched as shown in FIG. 21 (a). In this case, the AC voltage on the AC input terminals CC' of the self-exciting converter 43 is a quasi-sine wave as shown in FIG. 21 (b).

Alternatively, in order to make the voltage waveform at the converter side of the inductor 42 closer to a sine wave, it is preferable to interpose a low pass filter 24 between the inductor 42 and the self-exciting converter 43.

Although the self-exciting converter 43 shown herein is a single-phase converter, it is possible to use a plural-phase converter. It is also possible to use a current type self-exciting converter.

Seventh Embodiment

Now, described in a seventh embodiment of the present invention is a non-contact power feeder to employ a PFC (Power Factor Correction converter as a second method of supplying an AC output of the secondary winding to a load by converting into DC voltage.

The PFC converter is a converter in which a switching circuit (a DC chopper) is connected at the subsequent stage of a rectifier circuit and converts a DC voltage rectified by the rectifier circuit into a DC voltage of a desired level by the switching circuit. An improvement is made on the switching of the switching circuit for controlling not only the output voltage of the rectifier circuit but also the input AC current to the rectifier circuit.

FIG. 23 shows a non-contact power feeder of this embodiment. This power feeder comprises a high frequency AC power supply 3, a transformer with resonance capacitor 41, a low pass filter 24, a PFC converter 25 that is a combination of a diode rectifier 40 and a step-up chopper 26, a smoothing capacitor C, a load ZL and an PFC converter 25 disposed between the transformer with resonance capacitor 41 and the load ZL. It is to be noted that the low pass filter 24 may be provided if necessary in order to make the input voltage waveform to the PFC closer to a sine wave.

As well known, the PFC converter 25 controls ON/OFF of the switch S in the step-up chopper 26 so that the input AC current approaches a sine wave and phase of the input AC current I2 is substantially in-phase with that of the secondary side AC voltage V2.

FIG. 24 shows the relationship between the V2, the reactor current $I_L$ and the input AC current I2 over a half cycle period of the secondary side AC voltage V2 of the frequency f0 in a case when the step-up chopper 26 is operated in a non-continuous mode. The step-up chopper 26 repeats the following three operation states:
  (1) switch S: ON
  (2) switch S: OFF, $I_L \neq 0$
  (3) switch S: OFF, $I_L = 0$
This generates the reactor current $I_L$ as shown in FIG. 24. The waveform of the input AC current I2 is the same as the reactor current $I_L$ and the average current value of the input AC current I2 is a sine wave having the same phase as that of the secondary side AC voltage V2. As a result, the right side of AA' in FIG. 23 is equivalent to a resistive load.

The output voltage of the PFC converter 25 becomes larger than the maximum value of the secondary side AC voltage V2.

Since the non-contact power feeder is equivalent to a resistive load at the right side of AA' in FIG. 23 as described hereinabove, the power factor of the secondary side AC output is equal to 1. If the primary side power supply is a constant voltage source, the secondary side voltage V2 remains substantially constant even if the AC secondary current I2 may increase. Moreover, even if the secondary side load may be plural, the sum of the secondary voltages V2 is substantially constant regardless of load power and a substantially constant DC voltage is supplied to the load ZL.

It is to be noted that a typical PFC converter that combines the diode rectifier 40 and the step-up chopper 26 is shown as the PFC converter 25 in FIG. 25. However, PFC converter has various circuits. Basically the same advantages can be enjoyed even if any one of the various PFC converters may be used.

INDUSTRIAL APPLICABILITY

The non-contact power feeder according to the present invention can be widely applied to various machines and equipment including moving members such as transportation vehicles in a manufacturing plant, elevators and the like or codeless household electrical appliances, cellular phones and the like to which conventional non-contact power feeders are used thereby improving characteristics and achieving high efficiency, high power factor and independence to load.

What is claimed is:

1. A non-contact power feeder for supplying power by electromagnetic induction from a primary winding driven by an AC power supply to a secondary winding disposed with an air gap between the primary winding, further comprising:
  a series capacitor connected in series with one of the primary winding and the secondary winding and a parallel capacitor connected in parallel with the other one of the primary winding and the secondary winding; and
  the capacitance value Cp of the parallel capacitor converted to the primary side is set to:

$$Cp \approx 1/\{2\pi f0 \times (xo+X)\}$$

and the capacitance value Cs of the series capacitor converted to the primary side is set to:

$$Cs \approx (x0+X)/\{2\pi f0 \times (x0 \times x1 + x1 \times x2 + x2 \times x0)\}$$

where, f0 is the frequency of the AC power supply, x1 is the primary leakage reactance at the frequency F0 of the transformer comprising the primary winding and the secondary winding, x2 is the secondary leakage reactance converted to the primary side, x0 is the excitation reactance and X is x1 in case of connecting the parallel capacitor in parallel with the primary winding or x2 in case of connecting in parallel with the secondary winding.

2. A non-contact power feeder of claim 1, wherein if $$Cs0=(x0+X)/\{2\pi f0 \times (x0 \times x1 + x1 \times x2 + x2 \times x0)\},$$

the capacitance value Cs of the series capacitor is set within the following range:

$$(1-0.4)Cs0 \leq Cs \leq (1+0.4)Cs0.$$

3. Original): A non-contact power feeder of claim 2, wherein if $$Cp0=1/\{2\pi f0 \times (x0+X)\},$$

the capacitance value Cp of the parallel capacitor is set within the following range:

$$(1-0.4)Cp0 \leq Cp \leq (1+0.4)Cp0.$$

4. A non-contact power feeder for feeding power by electromagnetic induction from a primary winding driven by an AC power supply to a secondary winding disposed with an air gap between the primary winding, further comprising:

a series capacitor connected in series with the primary winding, a parallel capacitor connected in parallel with the secondary winding, an inductor connected in series between the secondary winding and the parallel capacitor and a load connected in parallel with the parallel capacitor; and when frequency of the AC power supply is f0, primary leakage reactance, secondary leakage reactance converted to the primary side, exciting reactance converted to the primary side of a transformer comprising the primary winding and the secondary winding are respectively x1, x2 and x0 and reactance of the inductor converted to the primary side is Xa, the capacitance value Cs of the series capacitor is set to:

$$Cs(x0+Y)/\{2\pi f0 \times (x0 \times x1 + x1 \times Y + Y \times x0)\}$$

and the capacitance value Cp of the parallel capacitor is set to form a resonance circuit together with the secondary winding and the inductor, where, f0 is the frequency of the AC power supply, x1 is the primary leakage reactance at the frequency f0 of the transformer comprising the primary winding and the secondary winding, x2 is the secondary leakage reactance converted to the primary side, x0 is the excitation reactance converted to the primary side, xa is the reactance of the inductor converted to the primary side and Y=x2+xa.

5. A non-contact power feeder for feeding power by electromagnetic induction from a primary winding driven by an AC power supply to a secondary winding disposed with an air gap between the primary winding, further comprising:

a series capacitor connected in series with the primary winding, a parallel capacitor connected in parallel with the secondary winding, a secondary side series capacitor connected between the secondary winding and the parallel capacitor, and a load connected in parallel with the parallel capacitor, wherein the capacitance Cs of the series capacitor is set to:

$$Cs \approx (x+Y)/\{2\pi f0 \times (x0 \times x1 + x1 \times Y + Y \times x0)\},$$

And the capacitances of the parallel capacitor and the secondary side series capacitor are set so that the overall capacitance Cp of the series connection of the parallel capacitor and the secondary side series capacitor constitutes a resonance circuit together with the secondary winding, where, f0 is the frequency of the AC power source, x1 is the primary leakage reactance of the transformer comprising the primary winding and the secondary winding, x2 is the secondary leakage reactance converted to the primary side, x0 is the excitation reactance converted to the primary side, and Y is x2.

6. A non-contact power feeder of claim 4, when $$Cs0=(x0+Y)/\{2\pi f0 \times (x0 \times x1 + x1 \times Y + Y \times x0)\},$$

the capacitance Cs of the series capacitor is set within the following range:

$$(1-0.4)Cs0 \leq Cs \leq (1-0.4)Cs.$$

7. A non-contact power feeder of claim 1, wherein at least one of the primary winding and the secondary winding is wound around a core.

8. A non-contact power feeder for feeding power by electromagnetic induction from a primary winding driven by an AC power supply to m (m>1) secondary windings of identical shape disposed with an air gap between the primary winding, further comprising:

a series capacitor Cs connected in series with the primary winding and m parallel capacitors connected respectively in parallel with the secondary windings, wherein the capacitance Cp of each of the parallel capacitors connected to the respective secondary winding and converted to the primary side is set to:

$$Cp \approx 1/\{2\pi f0 \times (x0+x2)\}$$

and the capacitance Cs of the series capacitor is set to:

$$Cs \approx (x0+x2)/\{m \times 2\pi f0 \times (x0 \times x1/m + x1 \times x2/m + x2 \times x0)\},$$

where, f0 is the frequency of the AC power supply, x1 is the primary leakage reactance at the frequency f0 of each of the m transformers comprising the primary winding and the secondary windings, x2 is the secondary leakage reactance converted to the primary side and x0 is the excitation reactance converted to the primary side.

9. A non-contact power feeder of claim 1, wherein a self-exciting converter is disposed through an inductor between the parallel capacitor Cp connected to the secondary winding and the load to which a DC power is supplied, and the power factor of the secondary side AC output that is outputted to the load through the parallel capacitor Cp is controlled by the self-exciting converter.

10. A non-contact power feeder of claim 9, wherein the amplitude and the phase of the AC voltage on the AC input terminal of the self-exciting converter are controlled based on the amplitude and the phase of the secondary side AC output voltage as well as the current flowing through the inductor.

11. A non-contact power feeder of claim 9, wherein the self-exciting converter is a PWM (Pulse Width Modulation) converter.

12. A non-contact power feeder of claim 9, wherein the self-exciting converter is a voltage type pulse width control converter.

13. A non-contact power feeder of claim 1, wherein a PFC (Power Factor Correction) converter is disposed between the parallel capacitor Cp connected to the secondary winding and a load to which a DC power is supplied, and the power factor of the secondary side AC output that is outputted to the load through the parallel capacitor Cp is controlled by the PFC converter.

14. A non-contact power feeder of claim 13, wherein a circuit comprising a diode bridge and a step-up chopper is employed as the PFC converter.

* * * * *